US012639120B2

(12) United States Patent (10) Patent No.: US 12,639,120 B2
Ganesan et al. (45) Date of Patent: May 26, 2026

(54) MANAGING USAGE OF RESOURCES IN A HYBRID COMPUTING ENVIRONMENT

(71) Applicant: Dell Products, L.P., Round Rock, TX (US)

(72) Inventors: Vaideeswaran Ganesan, Bangalore KA (IN); Pravin Janakiram, Bangalore KA (IN)

(73) Assignee: Dell Products L.P., Round Rock, TX (US)

( * ) Notice: Subject to any disclaimer, the term of this patent is extended or adjusted under 35 U.S.C. 154(b) by 854 days.

(21) Appl. No.: 17/858,913

(22) Filed: Jul. 6, 2022

(65) Prior Publication Data

US 2024/0012687 A1 Jan. 11, 2024

(51) Int. Cl.
*G06F 9/50* (2006.01)
*G06F 21/62* (2013.01)

(52) U.S. Cl.
CPC ........ *G06F 9/5033* (2013.01); *G06F 21/6218* (2013.01)

(58) Field of Classification Search
CPC ........................... G06F 9/5033; G06F 21/6218
USPC ........................................................ 718/104
See application file for complete search history.

(56) References Cited

U.S. PATENT DOCUMENTS

| | | | | |
|---|---|---|---|---|
| 7,373,497 B2 * | 5/2008 | Circenis | ................ | H04L 67/125 |
| | | | | 713/1 |
| 8,365,182 B2 * | 1/2013 | Groetzner | ............. | G06F 9/5083 |
| | | | | 718/104 |

| | | | | |
|---|---|---|---|---|
| 9,396,009 B2 * | 7/2016 | Biran | ....................... | H04L 47/76 |
| 9,798,629 B1 * | 10/2017 | Shilane | ............... | G06F 11/1466 |
| 10,547,521 B1 * | 1/2020 | Roy | .......................... | H04L 43/06 |
| 11,550,691 B2 * | 1/2023 | Muthusami | ........... | H04L 47/781 |
| 2012/0249065 A1 * | 10/2012 | Bissonette | ............ | B60L 53/665 |
| | | | | 320/109 |
| 2012/0290348 A1 * | 11/2012 | Hackett | ................ | G06Q 10/101 |
| | | | | 709/226 |
| 2017/0163507 A1 * | 6/2017 | Pai | ....................... | H04L 41/5051 |
| 2022/0121397 A1 * | 4/2022 | Appaji Lalithamba | ...................... |
| | | | | G06F 3/0668 |

* cited by examiner

*Primary Examiner* — Pierre Vital
*Assistant Examiner* — Daniel Trainor
(74) *Attorney, Agent, or Firm* — Amin, Turocy & Watson, LLP

(57) ABSTRACT

A module optimizes active and inactive components and resources of a hybrid computing system to optimize a combination of private and public resources to minimize cost and maximize performance of the hybrid computing system. A learning model may analyze past usage and present usage metrics of one or more components with respect to performance criteria or cost criteria. Cost factors associated with components of the private system may be based on wear—the higher the wear the less desirable a component's use becomes due to lower reliability and higher warranty costs. When activating a component of the private system, a deactivation of a higher wear component may be delayed allowing time for a recently activated component to be integrated with the private system. A resource of a public system may be used while deactivation of a high wear component is delayed.

20 Claims, 12 Drawing Sheets

Figure 8:
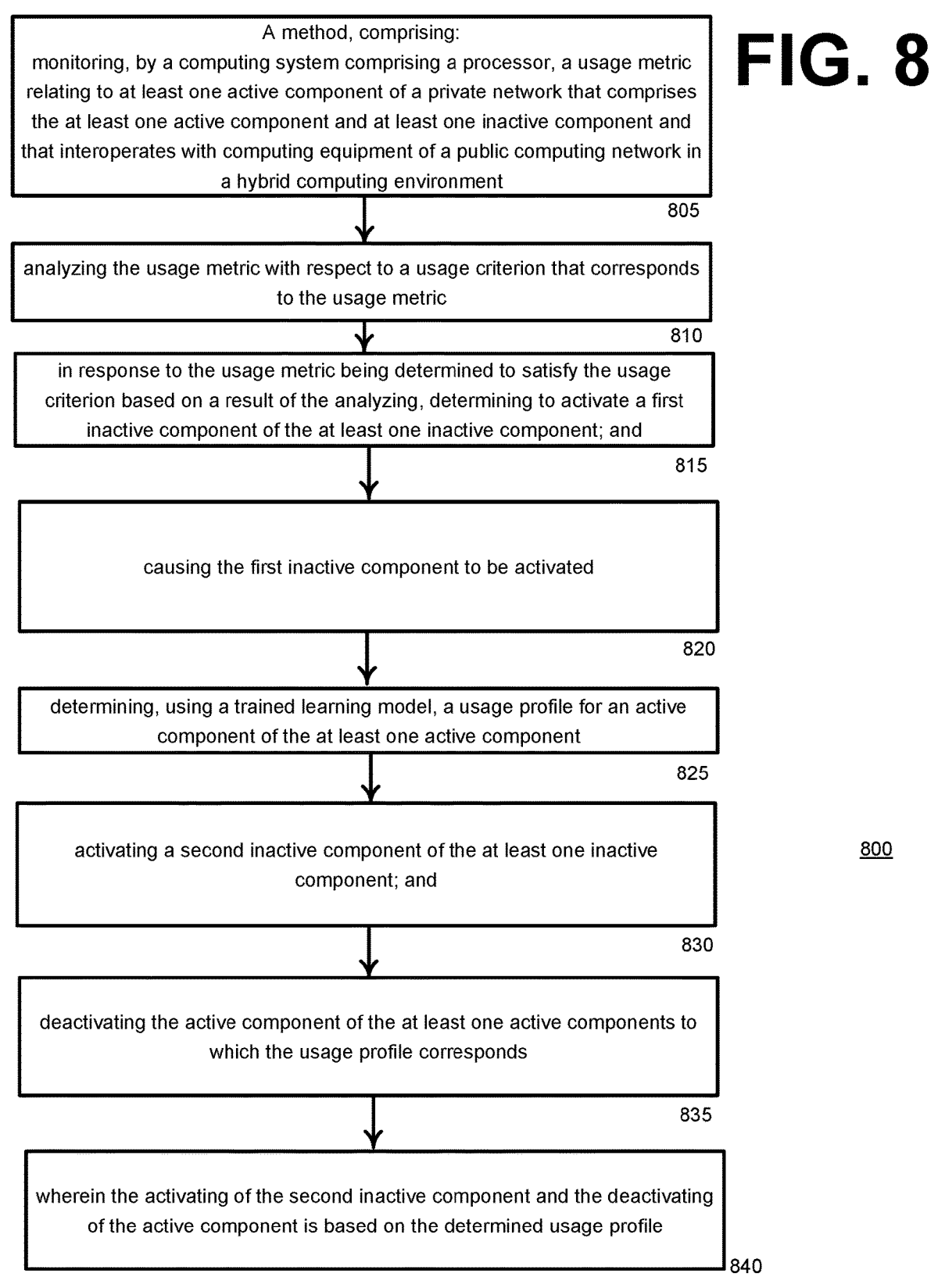

A method, comprising:

monitoring, by a computing system comprising a processor, a usage metric relating to at least one active component of a private network that comprises the at least one active component and at least one inactive component and that interoperates with computing equipment of a public computing network in a hybrid computing environment

805 analyzing the usage metric with respect to a usage criterion that corresponds to the usage metric

810 in response to the usage metric being determined to satisfy the usage criterion based on a result of the analyzing, determining to activate a first inactive component of the at least one inactive component; and

815 causing the first inactive component to be activated

820 determining, using a trained learning model, a usage profile for an active component of the at least one active component

825 activating a second inactive component of the at least one inactive component; and

830 deactivating the active component of the at least one active components to which the usage profile corresponds

835 wherein the activating of the second inactive component and the deactivating of the active component is based on the determined usage profile

Figure 9:
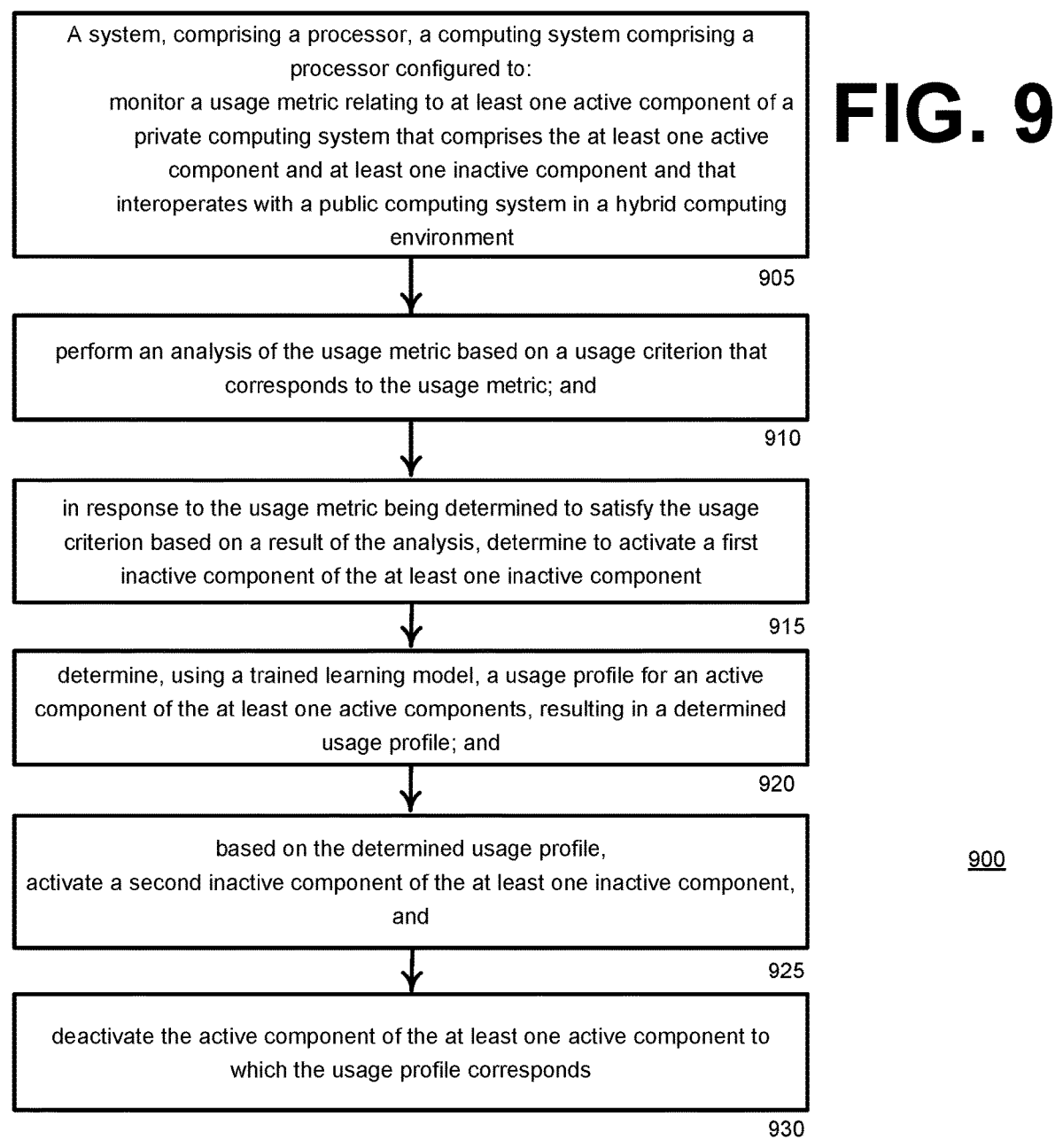

A system, comprising a processor, a computing system comprising a processor configured to:
monitor a usage metric relating to at least one active component of a private computing system that comprises the at least one active component and at least one inactive component and that interoperates with a public computing system in a hybrid computing environment

905 perform an analysis of the usage metric based on a usage criterion that corresponds to the usage metric; and

910 in response to the usage metric being determined to satisfy the usage criterion based on a result of the analysis, determine to activate a first inactive component of the at least one inactive component

915 determine, using a trained learning model, a usage profile for an active component of the at least one active components, resulting in a determined usage profile; and

920 based on the determined usage profile,
activate a second inactive component of the at least one inactive component, and

925 deactivate the active component of the at least one active component to which the usage profile corresponds

930

900

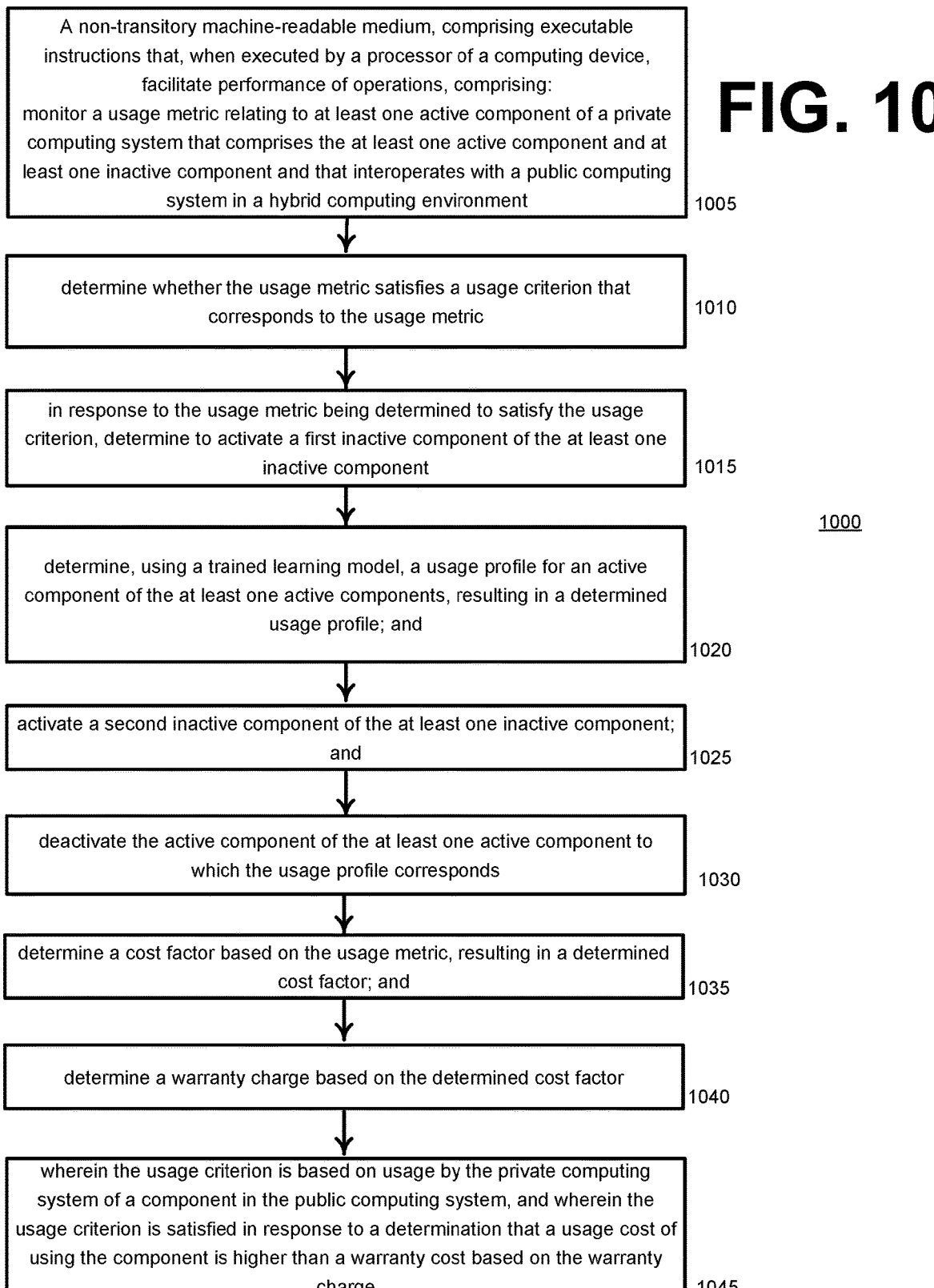

FIG. 10

A non-transitory machine-readable medium, comprising executable instructions that, when executed by a processor of a computing device, facilitate performance of operations, comprising:
monitor a usage metric relating to at least one active component of a private computing system that comprises the at least one active component and at least one inactive component and that interoperates with a public computing system in a hybrid computing environment — 1005 determine whether the usage metric satisfies a usage criterion that corresponds to the usage metric — 1010 in response to the usage metric being determined to satisfy the usage criterion, determine to activate a first inactive component of the at least one inactive component — 1015

1000 determine, using a trained learning model, a usage profile for an active component of the at least one active components, resulting in a determined usage profile; and — 1020 activate a second inactive component of the at least one inactive component; and — 1025 deactivate the active component of the at least one active component to which the usage profile corresponds — 1030 determine a cost factor based on the usage metric, resulting in a determined cost factor; and — 1035 determine a warranty charge based on the determined cost factor — 1040 wherein the usage criterion is based on usage by the private computing system of a component in the public computing system, and wherein the usage criterion is satisfied in response to a determination that a usage cost of using the component is higher than a warranty cost based on the warranty charge — 1045

MANAGING USAGE OF RESOURCES IN A HYBRID COMPUTING ENVIRONMENT

BACKGROUND

A cloud computing service provider may make available various computing resources, for example, software as a service, virtual machines, storage, bare metal computing hardware, or even a complete enterprise's infrastructure and development platforms, over a communication network. A cloud services provider may make a public cloud computing resource available to users over a publicly accessible network, such as the Internet. A private cloud computing resource is typically available or accessible only by a given customer, such as an enterprise and its employees. Computing resources may be provided from an enterprise's own on-premises data center or from a data center operated by an independent (e.g., independent from the enterprise customer) cloud services provider. A hybrid cloud may connect an organization's private cloud services and resources of public clouds into an infrastructure that facilitates the organization's applications and workloads in a manner that balances the maximizing of performance and the minimizing of costs.

Cloud providers, whether public or private, may use clustering of servers. A server cluster typically comprises servers that share a single Internet Protocol ("IP") address. Clustering enhances data protection typically, availability, load balancing, and scalability. A server associated with a cluster may be referred to as a node, which may comprise a hard drive, random access memory, ("RAM"), and central processing unit ("CPU") resources.

In a hybrid cloud environment, it is desirable for an organization to use resources of its private cloud as much as possible and to use public cloud computing resources to handle spikes in usage demands that would exceed a determined limit, or a capacity, of the organization's private network. An organization's private cloud computing system, or systems, may comprise active components, modules, storage, services, and other resources that facilitate computing needs of the enterprise. An organization's private cloud computing resources may also comprise idle, or inactive, components, modules, storage, services, and other resources that are essentially held in reserve but are not used until workload increases require additional resources than the active resources already being used and paid for by the enterprise. The enterprise may subscribe to the computing resources of their private network from a computing resources provider/cloud computing provider instead of maintaining the resources and owning them outright. A provider may increase a subscription fee when an enterprise activates idle/inactive resources. The subscription may include a warranty cost associated with given active computing resources, such as storage, a processing components or instances, network bandwidth, and the like. Typically, the more a resource has been used, the more 'wear' has been placed on it.

SUMMARY

The following presents a simplified summary of the disclosed subject matter in order to provide a basic understanding of some of the various embodiments. This summary is not an extensive overview of the various embodiments. It is intended neither to identify key or critical elements of the various embodiments nor to delineate the scope of the various embodiments. Its sole purpose is to present some concepts of the disclosure in a streamlined form as a prelude to the more detailed description that is presented later.

In an example embodiment, a method comprises monitoring, by a computing system comprising a processor, a usage metric relating to at least one active component of a private network, which may be referred to as a private computing network, or as a private computing system, or may comprise a public computing system, that comprises the at least one active component and at least one inactive component, or components, and that interoperates with computing equipment of a public computing network, or public computing system, in a hybrid computing environment. The private computing system may comprise components and resources owned or operated by an enterprise at a private data center of the enterprise. The private computing system may comprise components and resources that are used by a customer but that are owned or operated by a first third-party computing resources provider that owns and operates the components or resources a data center that is remote from a customer, which may be an organization such as an enterprise, a university, a government agency, and the like. The first third-party computing system provider may charge for use of components that are active and used on a subscription basis, for example a fee that is payable every month based on components or resources that are used by the customer. The public computing system may comprise a computing system operated by a second third-party, which may be the first third-party or a difference third party. An example of a public computing system may be cloud computing resources and services provided via a communication network (e.g., the Internet) by Amazon Web Services Inc. ("AWS"). The customer may have access to resources that it subscribes to from the first third-party and may also have access to computing resources that it pays for on an as-used basis to the second third-party. Such a combination of the public computing system and the private computing system may be referred to as a hybrid computing system, which may comprise a Hyper-Converged Infrastructure ("HCI"), or may be part of an HCI. The embodiment method may comprise analyzing the usage metric with respect to a usage criterion that corresponds to the usage metric. The usage metric may comprise a value, quantity, or other measurement of resources used, which may be a value with respect to time, or over a period. For example, a processing metric for a processing resource, or processing resources, during a given very short sample period (e.g., 1 mS) may be thought of as an instantaneous value in terms of computations per second, whereas a processing metric for a longer period, for example, a week, may comprise an average, or mean, of instantaneous processing values over the week. The usage metric may be simply how long a particular component has been active or in service, either continuously, or cumulatively. A usage criterion for a short sample period of 1 mS may be the same as, or different from, a usage criterion for the longer period. Similarly, a storage metric may comprise a value that represents a percentage that a storage is used, or not free to accept additional data. Short and long criteria may be applied to storage like with processing resources, but typically storage usage tends to trend toward a storage resource getting closer and closer to a determined capacity over time instead of representing wide fluctuations based on instantaneous use as with processing resources. (Use of a storage component, or resource, may be reduced by deleting stored data or offloading it to a different storage components or resource.) A usage criterion may be determined, for example by a user (e.g., an IT personnel of an enterprise) of the private computing system, at a level that is lower than a maximum performance, or output of a component or resource. For example, if a user selects, or determines to use, 80% for a criterion for a given resource or component, this may represent a limit of 800 computations per second if a given processing resource is rated to reliably provide 1,000 computations per second, or may represent for a storage component, such as a hard disc drive with a capacity to store 1 Terabyte of data, an 800 GigaByte limit. A usage criteria may correspond to a wear factor, wear score, or wear value, that indicates how long a component has been in service.

In response to the usage metric being determined to satisfy, the usage criterion based on a result of the analyzing (e.g., the usage metric exceeds a processing per second criteria for a processing resource or a determined storage limit that is less than 100% full for a storage resource), determining to activate a first inactive component of the at least one inactive component and causing the first inactive component to be activated. Thus, when a component, or resource exceeds a criterion, or criteria, (e.g., a storage has exceeded 80% of its capacity, or a component has been powered on for a determined amount of time) additional resources (e.g., another storage component) that have been inactive and not paid for in a subscription are activated and will be paid for in a subscription for use of components or resources of the private computing system.

The usage metric may be representative of, or correspond to, a storage utilization value. The usage metric may be representative of a computations per second value. The usage metric may be representative of, or correspond to, a network throughput value. The usage metric may be representative of, or correspond to, an input/output operations per second value. The usage metric may be representative of, or correspond to, an instructions per second, or a computations per second value. The usage metric may be representative of, or correspond to, an amount of time a component has been powered on, either continuously or cumulatively since it was powered on. Components may be able to self-report their usage metrics, or the metrics may be determined by the computing system in which they operate.

The method may further comprise determining, using a trained learning model, a usage profile for an active component of the at least one active component. The exemplary embodiment method may further comprise determining, using an untrained learning model, a usage profile for an active component of the at least one active component. The learning model, whether trained or untrained initially, may not be initialized with a corpus of system usage information, or the model may be initialized with a corpus of system usage information corresponding to the private computing system in a hybrid computing environment or may correspond to a different private computing system in a hybrid computing environment.

The method may further comprise activating a second inactive component of the at least one inactive component and deactivating the active component of the at least one active components to which the usage profile corresponds, wherein the activating of the second inactive component and the deactivating of the active component is based on the determined usage profile. For example, if a storage component of the private computing system, such as a hard disc drive, has been operating for two years, but another storage component of the private computing system has been idle/inactive and has never operated, the usage profile determined for the storage component that has been in service for two years may indicate a wear score, factor, ranking, or other value that corresponds to a warranty charge for the active storage resource being higher than a warranty charge would be for the currently inactive storage component if the inactive component were placed into service and the currently active storage component were deactivated, even though the capacity, or a determined criteria based thereon, of the currently active storage component to be deactivated is not exceeded. Thus, instead of a determination being made to activate a component based on capacity being almost consumed, a determination may be made that a usage criterion of an amount of time in service has been exceeded by the currently active component.

The method may further comprise waiting an integration period that corresponds to integrating the activated first inactive component into the private computing network top allow a newly activated component to be booted, tested, and otherwise operationally be integrated with the private computing system. After the wait/integration period expires the active component of the at least one active components to which the usage profile corresponds after the integration period may be deactivated. The activating of the second inactive component and the deactivating of the active component may be based on the determined usage profile, which may include wear factors, wear indicators, wear scores, or wear rankings.

In an embodiment, the usage criterion may be based on usage, via the private network, of a component, or resource, of the network equipment of the public network. For example, a cost to use a processing resource of a public network may be analyzed with respect to a cost (including a warranty cost) of activating and using a currently inactive component or resource of the private network. Providers of public computing networks often 'advertise' (typically electronically, for example to a module performing the steps of the method) pricing for resources of the public computing system. Like with retail stores that have flash sales, promotions, etc., a public computing system may advertise a promotional rate for storage resources, have a flash sale for processing, resources, and the like. In addition, public computing resources may be 'offered' electronically on a 'spot market' such that when a public computing resources provider has excess capacity (supply), that provider's and competitors of that provider, prices may drop to meet demand. Thus, a module performing the method may automatically monitor pricing from public computing resource providers and may dynamically adjust usage criteria in response to changing market prices for public computing system resources. For example, if pricing for public computing system storage resources drops, a criteria may be adjusted to a lower limit (e.g., a lower number of computations per second or a lower percentage of a full storage capacity of a storage component) and instead of activating the first inactive component or resource of the private network when the criteria is exceeded, a resource that corresponds to the changed criteria may be engaged from the public computing system.

The method may further comprise determining a cost factor based on the usage metric, resulting in a determined cost factor. A warranty charge may be based on the determined cost factor. The usage criterion may be based on usage, via the private network, of a component of the computing equipment of the public computing network, and wherein a threshold associated with the usage criterion is exceeded when a usage cost, corresponding to the usage of the component of the computing equipment of the public network via the private network is higher than a warranty cost determined based on the warranty charge.

In an embodiment, a system, comprising a computing system comprises a processor configured to monitor a usage metric relating to at least one active component of a private computing system that comprises the at least one active component and at least one inactive component and that interoperates with a public computing system in a hybrid computing environment; perform an analysis of the usage metric based on a usage criterion that corresponds to the usage metric; and in response to the usage metric being determined to satisfy the usage criterion based on a result of the analysis, determine to activate a first inactive component of the at least one inactive component. In an embodiment, instead of determining to activate an inactive component of a plurality of inactive components of a private network, a module may determine to use a public computing system resource instead.

The processor may be further configured to determine, using a trained learning model, a usage profile for an active component of the at least one active components, resulting in a determined usage profile; and based on the determined usage profile, activate a second inactive component of the at least one inactive component, and deactivate the active component of the at least one active component to which the usage profile corresponds. A resource of a public computing system may be used to facilitate transitioning the activated second inactive (previously inactivated) component such that the public resource is used while the newly activated component or resource is brought online, tested, etc.

The processor may be further configured to determine a cost factor based on the usage metric, resulting in a determined cost factor; and determine a warranty charge based on the determined cost factor, wherein the usage criterion is based on usage by the private computing system of a component in the public computing system, and wherein the usage criterion is satisfied when a usage cost, corresponding to the usage by the private computing system is higher than a warranty cost based on the warranty charge. Thus, usage metric may be an amount of time the component or resource has been in service and the corresponding usage criteria may be an amount of time-in-service limit.

The processor may further configured to determine a cost factor based on the usage metric, wherein the usage criterion is based on usage by the private computing system of a component in the public computing system, wherein the usage criterion is based on a time of week of usage by the private computing system of the component, and wherein the usage criterion is satisfied when a usage cost of using the component of the public computing system is higher than a cost of using the second inactive component of the at least one inactive component.

The processor may be further configured to determine a cost factor based on the usage metric, wherein the usage criterion is based on usage by the private computing system of a component in the public computing system, wherein the usage criterion is based on a frequency of usage by the private computing system of the component, and wherein the usage criterion is satisfied when a usage cost of using the component by the private computing system is higher than a cost of using the component via the public computing system.

BRIEF DESCRIPTION OF THE DRAWINGS

FIG. 8 illustrates a block diagram of an example method.

FIG. 9 illustrates a block diagram of an example system.

FIG. 10 illustrates a block diagram of an example non-transitory machine-readable medium.

DETAILED DESCRIPTION OF THE DRAWINGS

Figure 1:
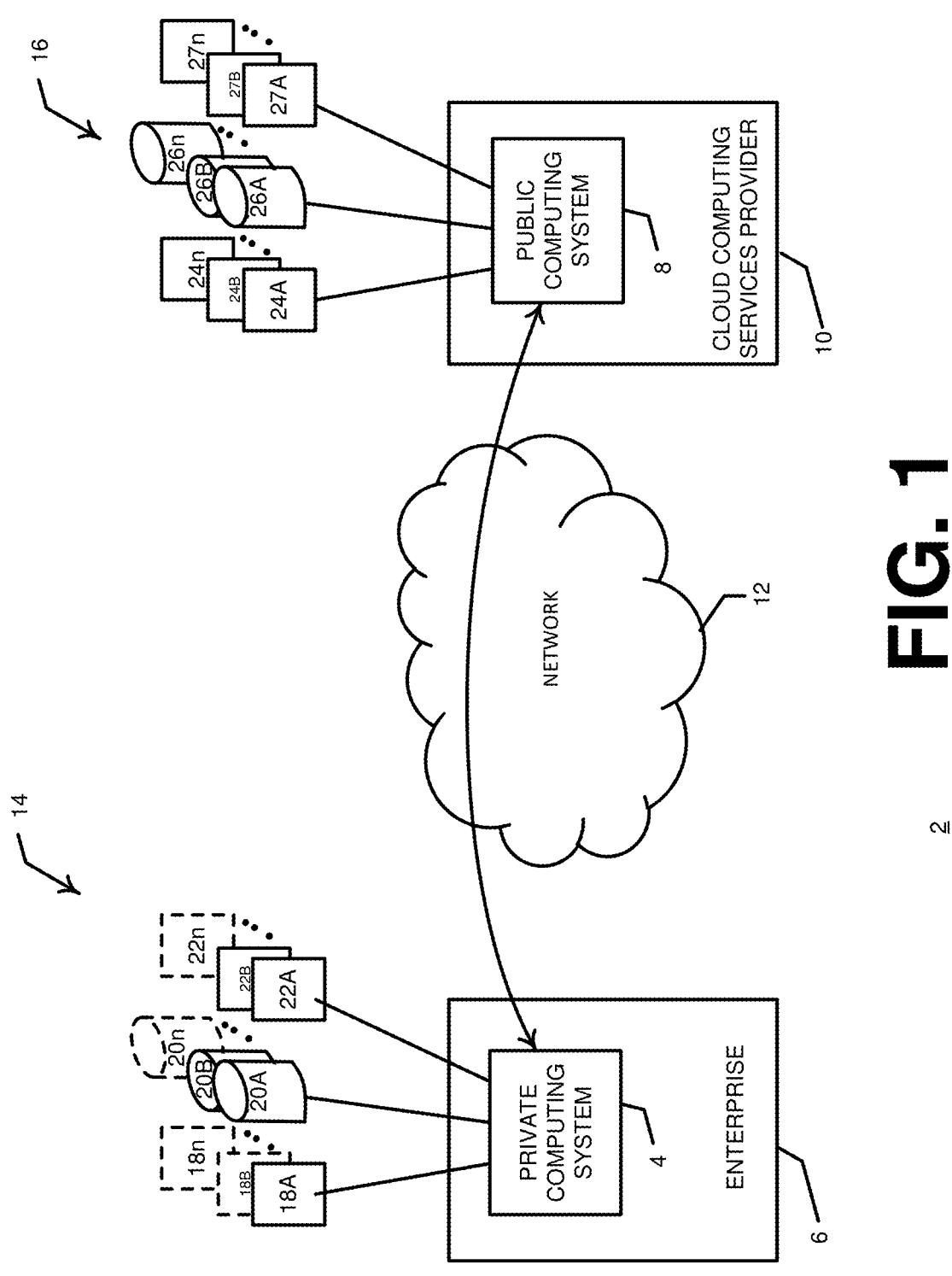
FIG. 1 illustrates an exemplary hybrid computing system.

As a preliminary matter, it will be readily understood by those persons skilled in the art that the present embodiments are susceptible of broad utility and application. Many methods, embodiments, and adaptations of the present application other than those herein described as well as many variations, modifications and equivalent arrangements, will be apparent from or reasonably suggested by the substance or scope of the various embodiments of the present application.

Accordingly, while the present application has been described herein in detail in relation to various embodiments, it is to be understood that this disclosure is only illustrative and exemplary of one or more concepts expressed by the various embodiments and is made merely for the purposes of providing a full and enabling disclosure. The following disclosure is not intended nor is to be construed to limit the present application or otherwise exclude any such other embodiments, adaptations, variations, modifications and equivalent arrangements, the present embodiments described herein being limited only by the claims appended hereto and the equivalents thereof.

As used in this disclosure, in some embodiments, the terms "component," "system" and the like are intended to refer to, or comprise, a computer-related entity or an entity related to an operational apparatus with one or more specific functionalities, wherein the entity can be either hardware, a combination of hardware and software, software, or software in execution. As an example, a component can be, but is not limited to being, a process running on a processor, a processor, an object, an executable, a thread of execution, computer-executable instructions, a program, and/or a computer. By way of illustration and not limitation, both an application running on a server and the server can be a component.

One or more components can reside within a process and/or thread of execution and a component can be localized on one computer and/or distributed between two or more computers. In addition, these components can execute from various computer readable media having various data structures stored thereon. The components can communicate via local and/or remote processes such as in accordance with a signal having one or more data packets (e.g., data from one component interacting with another component in a local system, distributed system, and/or across a network such as the internet with other systems via the signal). As another example, a component can be an apparatus with specific functionality provided by mechanical parts operated by electric or electronic circuitry, which is operated by a software application or firmware application executed by a processor, wherein the processor can be internal or external to the apparatus and executes at least a part of the software or firmware application. As yet another example, a component can be an apparatus that provides specific functionality through electronic components without mechanical parts, the electronic components can comprise a processor therein to execute software or firmware that confers at least in part the functionality of the electronic components. While various components have been illustrated as separate components, it will be appreciated that multiple components can be implemented as a single component, or a single component can be implemented as multiple components, without departing from example embodiments.

The term "facilitate" as used herein is in the context of a system, device or component "facilitating" one or more actions or operations, in respect of the nature of complex computing environments in which multiple components and/or multiple devices can be involved in some computing operations. Non-limiting examples of actions that may or may not involve multiple components and/or multiple devices comprise transmitting or receiving data, establishing a connection between devices, determining intermediate results toward obtaining a result, etc. In this regard, a computing device or component can facilitate an operation by playing any part in accomplishing the operation. When operations of a component are described herein, it is thus to be understood that where the operations are described as facilitated by the component, the operations can be optionally completed with the cooperation of one or more other computing devices or components, such as, but not limited to, sensors, antennae, audio and/or visual output devices, other devices, etc.

Further, the various embodiments can be implemented as a method, apparatus or article of manufacture using standard programming and/or engineering techniques to produce software, firmware, hardware or any combination thereof to control a computer to implement the disclosed subject matter. The term "article of manufacture" as used herein is intended to encompass a computer program accessible from any computer-readable (or machine-readable) device or computer-readable (or machine-readable) storage/communications media. For example, computer readable storage media can comprise, but are not limited to, magnetic storage devices (e.g., hard disk, floppy disk, magnetic strips), optical disks (e.g., compact disk (CD), digital versatile disk (DVD)), smart cards, and flash memory devices (e.g., card, stick, key drive). Of course, those skilled in the art will recognize many modifications can be made to this configuration without departing from the scope or spirit of the various embodiments.

A monitor service may monitor usage of parts (e.g., components or resources) in a context, for example a warranty context where a warranty cost is included in a subscription, for components or resources of a computing system, and orchestrate an or facilitate optimal part, component, or resource usage to reduce downtime of the computing system and to reduce need for component replacement. Determining optimal part, component, or resource usage may be based on a usage profile that may be based on, or determined from, the monitoring. The monitoring service may run on a SmartNIC or iDRAC or iSM or VxRail Manager or OpenBMC or any such controller of the computing system. If there is a computing cluster involved, then the monitoring service may be part of multiple monitoring service with some of the services acting as clients of a master of the monitoring services—which master of the services may act as a main interface for the others with respect to the computing system.

In an embodiment, a vendor of private computing services may provide a Subscription-based Dynamic Warranty Service—like other hybrid computing system services that are billed according to a subscription. A warranty charge for components of a private computing system may be based on a number of components in the system—more dense systems having more components than another system may have higher warranty pricing than a less dense system. A warranty charge may be computed based on enabled, or activated, parts or components (e.g., a component may be deemed activated when the component is powered on). An upfront warranty cost (warranty cost for hardware with minimal viable parts) can be charged, and the rest of the warranty cost may be computed, for example, as follows: monthly unit warranty cost x number of components that are active and may be charged on a per month basis.

A Dynamic Warranty Monitor, or dynamic resources monitor, may continuously monitor metrics related to operation of parts or components that are active in a private computing system and report the monitored metrics, or values that correspond to the metrics, to a Dynamic Warranty Subscription Service (DWSS), or to a Dynamic Subscription Service ("DSS"). The DWSS, or DSS, may consider a usage profile corresponding to monitored metrics in computing subscription pricing, which may include warranty pricing. For example, a provider of private computing resources may charge a customer based on a determined average number of enabled processing cores per month; a periodic warranty cost may be included in a customer's periodic bill or invoice.

In an embodiment, a usage metric, which may be used to determine a usage profile, for a given component used in a private computing system for a particular customer may be based on a number of hours the component was in use during a billing period or based on a wear level. Low wear level components may be prioritized for activation as compared to high wear level component; conversely high-wear components may be prioritized for deactivation. A wear distribution algorithm may be run by an HCI Software subsystem to optimize uniform wear among components of a private computing system based on one or more usage profiles corresponding to the components such that components having a wear score, or ranking, corresponding to higher wear than scores or rankings of other components that correspond to lower wear may be prioritized for deactivation (e.g., powering off) instead of keeping the components with higher wear active but using the active higher wear components less.

In an embodiment, a wear distribution algorithm may use an artificial intelligence machine learning model to prioritize, or rank, components of a system, including active and inactive components, according to the wear—with low wear parts ranking higher compared to high wear parts. The monitoring module may determine wear levels for certain types of components, which may be configured to report their own wear levels, such as solid-state drives using non-volatile memory express, or number of hours in operation normalized to uptime of a server of which is a part, converted into a percentage. Thus, all the parts may be ranked based on a wear percentage.

In an embodiment, the highest wear percentage is evaluated and indicated as corresponding to a determined High Level. An acceptable wear usage criterion, or level, may be computed based on a determined management strategy. To have low but uneven wear, a wear level of about 30 points, or 30%, below the High Level may be selected. Alternately, an average, or median, wear may be determined to be the acceptable wear usage criteria.

Components which have an associated wear level that exceed the acceptable criteria may be considered for standby status. For example, new, unused components may be first enabled/activated by a monitoring module, which may be part of an HCI management software system, and as each component is activated, the HCI monitoring and management software module adds the newly activated component to a list of active components and deactivates the standby component. The standby components may remain powered up while newly added components are booting, being loaded with data, being tested, or otherwise being integrated into the computing system of which they are part. Once the system stabilizes and the newly activated components are integrated and ready for operation, the standby parts may be deactivated (e.g., powered off).

If enough deactivated, or inactivated, components having an acceptable wear level are not available to support a computing systems workload, some of the workload may be transitioned to a public cloud computing system until inactive components reach a common acceptable level. Transferring of workload in this manner may be determined based on a warranty cost of active or inactive components. It will be appreciated that as newly activated components operate over time, components that were previously deactivated based on corresponding usage profiles to balance wear among components may eventually have an acceptable wear level because the usage criteria may change as the newly activated components experience use and wear themselves. The High Wear level of the currently active components rises which causes the acceptable usage criterion, or criteria, to rise relative to the currently inactive components thus making the inactive component more likely to meet the revised acceptable usage criteria because their usage profiles, which do not change while they are deactivated, may not exceed the acceptable usage criteria, or wear criteria, anymore because the acceptable use criteria among the active components has risen.

The monitoring module may instruct the HCI software to drop (e.g., deactivate) some of the parts from the bottom of the list of active components without negatively impacting overall system performance. For example, if certain drives are standby status (e.g., not turned off but not currently being used), then the parts which are at the bottom of the wear list based on having the highest wear level of currently active components can replace the standby components, which may be powered off. For example, if four copies of a storage volume are used by the private computing system but a determination is made that an optimal number of copies needed is only three, a standby storage component could be powered off and a currently active storage component that is at the bottom of the usage list based on having the most wear of the currently active storage volumes could be moved to standby status (e.g., a hard disk drive may be powered on but its heads are disengaged and its discs do not spin). Thus, by using usage profiles corresponding to components, whether active, deactivated, or standby status, the wear distribution algorithm may reduce wear, and corresponding incremental warranty costs, corresponding to active, powered-on components by having fewer components powered on.

Thus, the Wear Distribution Algorithm may distribute workloads in conjunction with HCI software and leveraging public cloud computing system resources by dynamically enabling and disabling parts, components, and resources of the private computing system (consistent with Hybrid experience) to ensure that wear levels of components of the private computing system are distributed to optimize warranty costs while reducing component downtime. The Wear Distribution Algorithm differs from standard wear leveling algorithms, which typically allow continued use of components with high wear levels for workloads, but just use the high-wear components sparingly. Using a Wear Distribution Algorithm as described herein may result in high-wear components being turned off. Such turning off of components is facilitated by the ability of a hybrid computing system to turn on and off resources without decreasing operational functionality of the hybrid computing system. Wear distribution as disclosed herein may comprise turning on recommended components of a private computing system (e.g., components having low wear compared to other similar components), waiting until the private computing system settles down after introducing the newly activated components or resources, and turning off components selected by the wear distribution algorithm for deactivation.

Turning now to the figures, FIG. 1 illustrates computing system 2, which may comprise a hybrid computing system. System 2 may comprise private computing system 4 operated by an enterprise 8, which may be a business, a learning institution, a government agency, and the like. Private computing system 4 may communication with public computing system 8, which may be operated by a clous computing services provider 10, via communication network 12, which may comprise the Internet. Private computing system 4 may comprise a plurality of computing resources, for example processing resources 18A-18$n$, storage resources 20A-20$n$, and software resources 22A-22$n$. Private computing system 4 may comprise resources other than processing, storage, and software, which are only shown for purposes of illustration and discussion and are not meant to be limiting. Processing resources 18B-18, storage resources 20$n$, and software resources 22$n$ are illustrated with broken lines to indicate that they are inactive, or idle, resources as compared to processing resources 18A, storage resources 20A-20B, and software resources 22A-22B which are illustrated with unbroken lines to indicate that they are active resources. Public computing system 8 may comprise a plurality of computing resources, for example processing resources 24A-24$n$, storage resources 26A-26$n$, and software resources 27A-27$n$. Public computing system 8 may comprise other resources than processing, storage, and software, which are only shown for purposes of illustration and discussion.

Figure 2A:
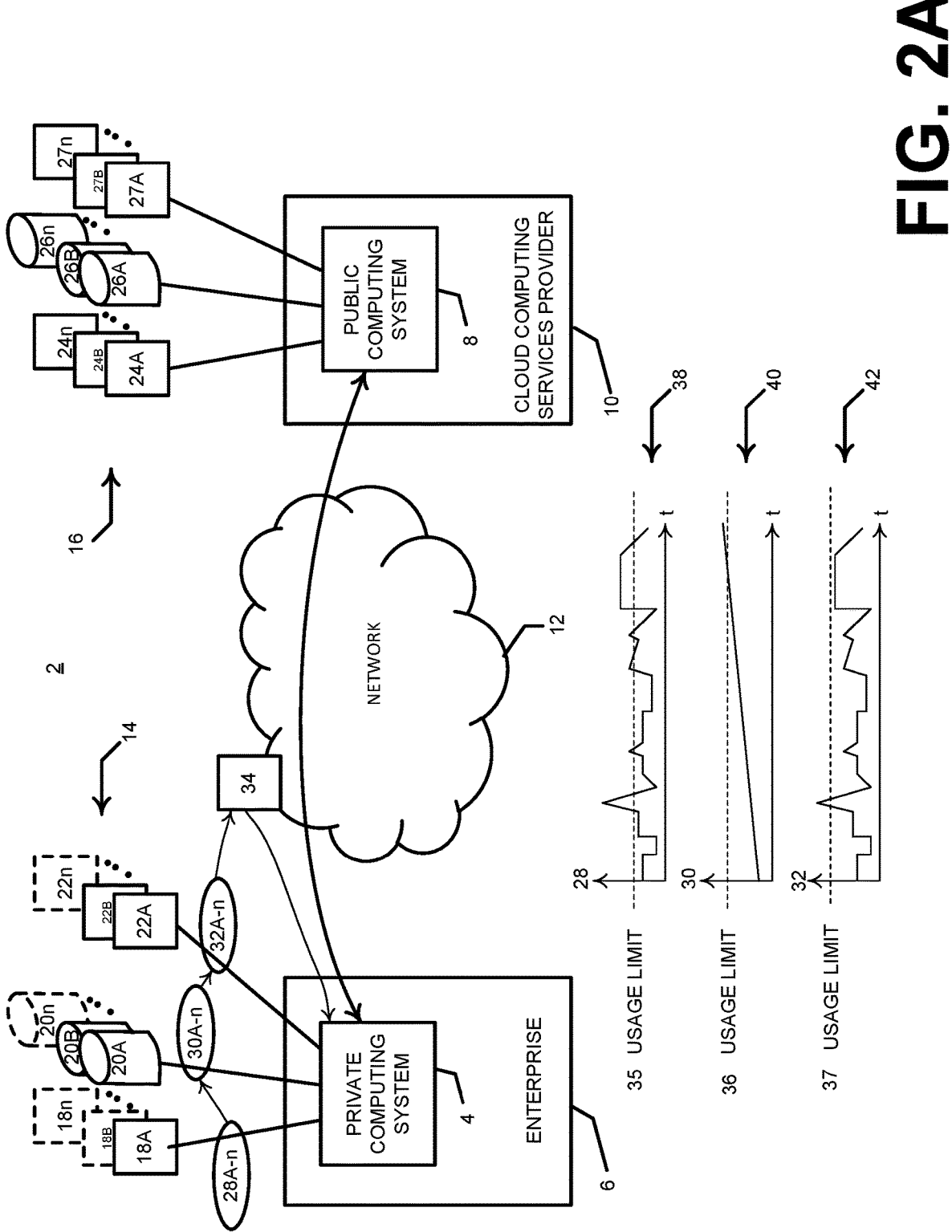
FIG. 2A illustrates an exemplary hybrid computing system showing an aspect with active and inactive components of a private computing portion of the hybrid computing system.

Turning now to FIG. 2A, the figure illustrates system 2 with monitors 28A-28n, and 32A-32n, which monitor usages of computing resources 18A-18n, 20A-20n, and 22A-22n, respectively. Monitors 28A-28n, 30A-30n, and 32A-32n may comprise computing services. In an example embodiment, a service monitors usage of components in a given context, for example, in a context of warranty of separate components, and may orchestrate and optimize a parameter corresponding to a component, for example, warranty pricing, as well as optimizing component usage based on a wear metric to reduce downtime of a computing system and to reduce need for component replacement. Monitors 28A-28n, 30A-30n, and 32A-32n can run on a SmartNIC, iDRAC, iSM, VxRail Manager, OpenBMC, or any similar controller that is coupled with the components being monitored, for example, components, or resources, 18A-18n, and 22A-22n. In an embodiment, private computing system 4 may comprise computing clusters and one of monitors 28A-28n may become a master monitor service with the rest of monitors 28A-28n becoming client monitor services to the master, one of monitors 30A-30n may become a master monitor service with the rest of monitors 30A-30n becoming client monitor services to the master, and one of monitors 32A-32n may become a master monitor service with the rest of monitors 32A-32n becoming client monitor services to the respective master. In an embodiment, one of monitors 28A-28n, 30A-30n, and 32A-32n may be a master and the other monitors may be clients of the master. In an embodiment, the master, or masters, may operate as an interface(s) for its/their respective clients to a component management service 34, which may be a service running on a computing system that is remote from enterprise private computing system 4. Component management service 34 may communicate with private computing system 4 with instructions, which may comprise recommendations, as to one or more components/resources 18A-18n, 20A-20n, and 22A-22n to deactivate if currently active or to activate if currently inactive based on metrics monitored by monitors 28A-28n, 30A-30n, and 32A-32n. In an embodiment, component management service 34 may comprise a service running on private computing system 4. Component management service 34 may comprise a service running on a third computing system coupled with communication network 12 that is not private computing system 4 or public computing system 8, or the component management service 34 may comprise a service running on public computing system 8. Component management service 34 may perform various functions, including determining whether to activate or deactivate one or more components or resources of private computing system 4 based on a wear value, or factor. In addition, component management service 34 may determine whether to activate or deactivate a component, or resource, of private computing system 4 based on an analysis of a cost to activate a component or resource of the private computing system compared with a cost to use one or more components, or resources, of public computing system 8 instead of activating the component or resource of private computing system 4.

Management service 34 may use usage criteria 35, 36, and 37 that correspond to components/resources 18A-18n, 20A-20n, and 22A-22n. Criteria 35, 36, and 37 may be determined by a user of private computing system 4, a module of the private computing system, or an AI service that executes on management service 34, that the management service comprises, or to which the management service has access. Criteria 35, 36, and 37 may be determined to be less than a maximum usage that a given component can provide (e.g., a maximum instructions per second for a processing resource or maximum bytes a storage resource can hold). Usage criteria 35, 36, and 37 may be determined based on wear levels of active components of private computing system 4. Metrics 38, 40, and 42 correspond to components/resources 18A-18n, 20A-20n, and 22A-22n and may indicate a usage of a single component (such as processing resource 18A, storage resource 20B, and other resource 22B) or all of the components/resources 18A-18n, 20A-20n, and 22A-22n to which they correspond. Metrics 38, 40, and 42 may be part of a usage profile for corresponding components, or may be used to determine wear rankings, or scores. Metric 38, which corresponds to usage of components 18A-18n, is shown graphically with respect to time (seconds, minutes, days, weeks, etc.). Metric 38 mostly falls below its corresponding usage limit 35, but also mostly near the usage limit. Metric 42 also mostly falls below its corresponding usage limit 37. On the other hand, although metric 40 mostly falls below its corresponding usage limit 36, the trend of metric 40 over the period shown graphically is that the usage limit of storages 20A and 20B is nearing usage limit 36, and in fact exceeds the usage limit 36 near the later part of the period graphically shown in FIG. 2A.

Figure 2B:
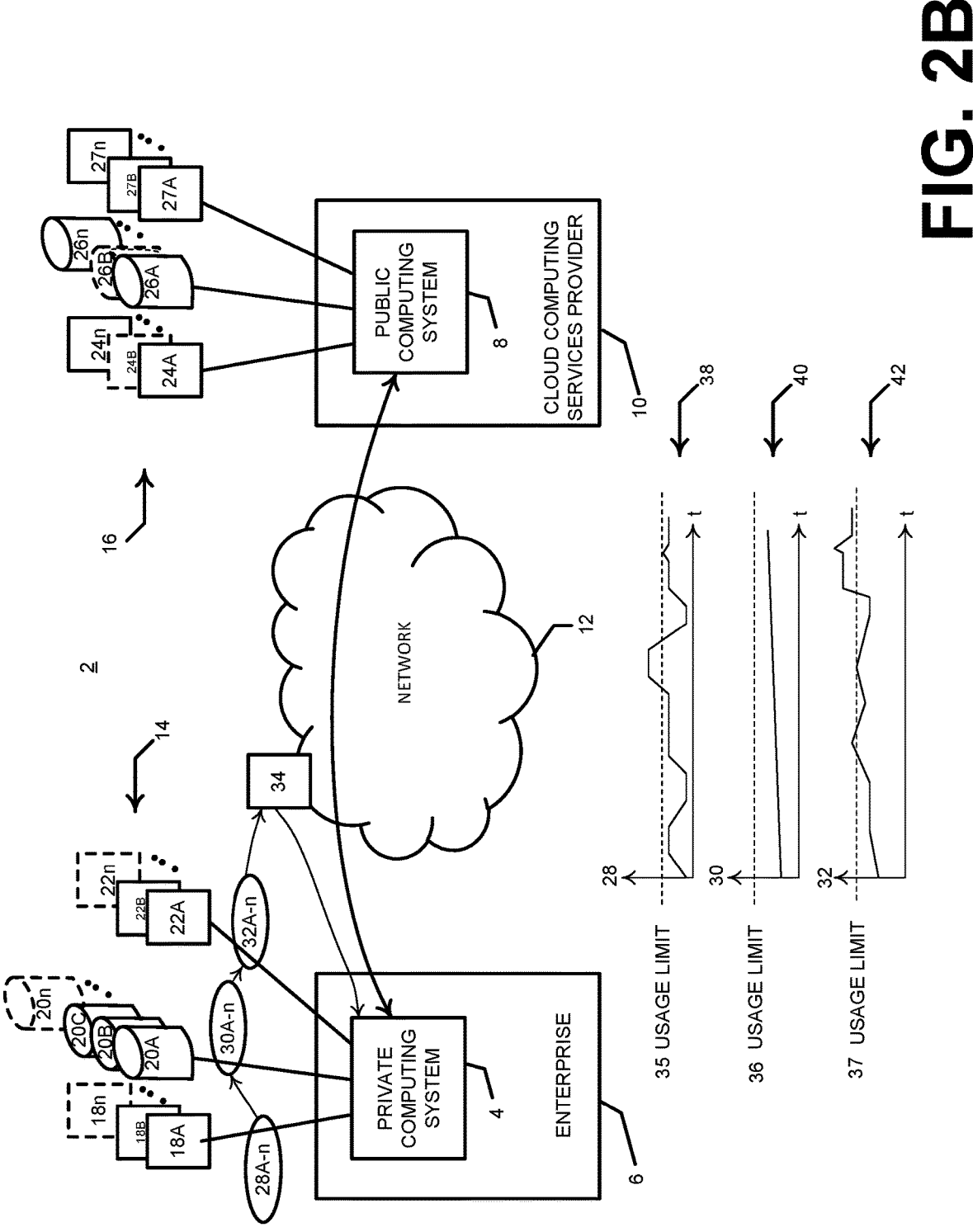
FIG. 2B illustrates an exemplary hybrid computing system showing an aspect with additional active components of a private computing portion of the hybrid computing system and inactive components of a public computing portion of the hybrid computing system.

Turning now to FIG. 2B, in response to determining that metric 38 was close to, or exceeded, usage limit 35, management service 34 may instruct private computing system 4 to activate another processing resource 18B. Accordingly, processing resource 18B is shown in unbroken lines, as compared to broken lines in FIG. 2A, to indicate that processing resource 18B has been activated. After processing resource 18B has been activated, less processing resources from public computing system 8 may be needed by private computing system 4, thus processing resource 24B of the public computing system is shown rendered in broken lines. Rendering processing resource 24B in broken lines doesn't necessarily indicate that computing services provider 10 has deactivated processing resource 24B; rendering processing resource 24B in broken lines only indicates that private computing system 4 is no longer relying on processing resource 24B to provide extra processing capacity and thus enterprise 6 no longer needs to pay for use of processing resource 24B. FIG. 2B shows metric 38 not exceeding usage limit 35 most of period t. Another storage resource 20C has also been activated as shown in unbroken lines in FIG. 2B, with corresponding metric 30C shown below usage metric 36. As with processing resource 24B no longer being needed by private computing system 4, storage resource 26B is shown in broken lines to indicate that the private computing system no longer needs to rely on, nor does enterprise 6 need pay for, extra storage capacity that was provided by storage resource 26B before storage resource 20C was activated. Metric 42 is shown mostly at, or exceeding, usage limit criteria 37.

Figure 2C:
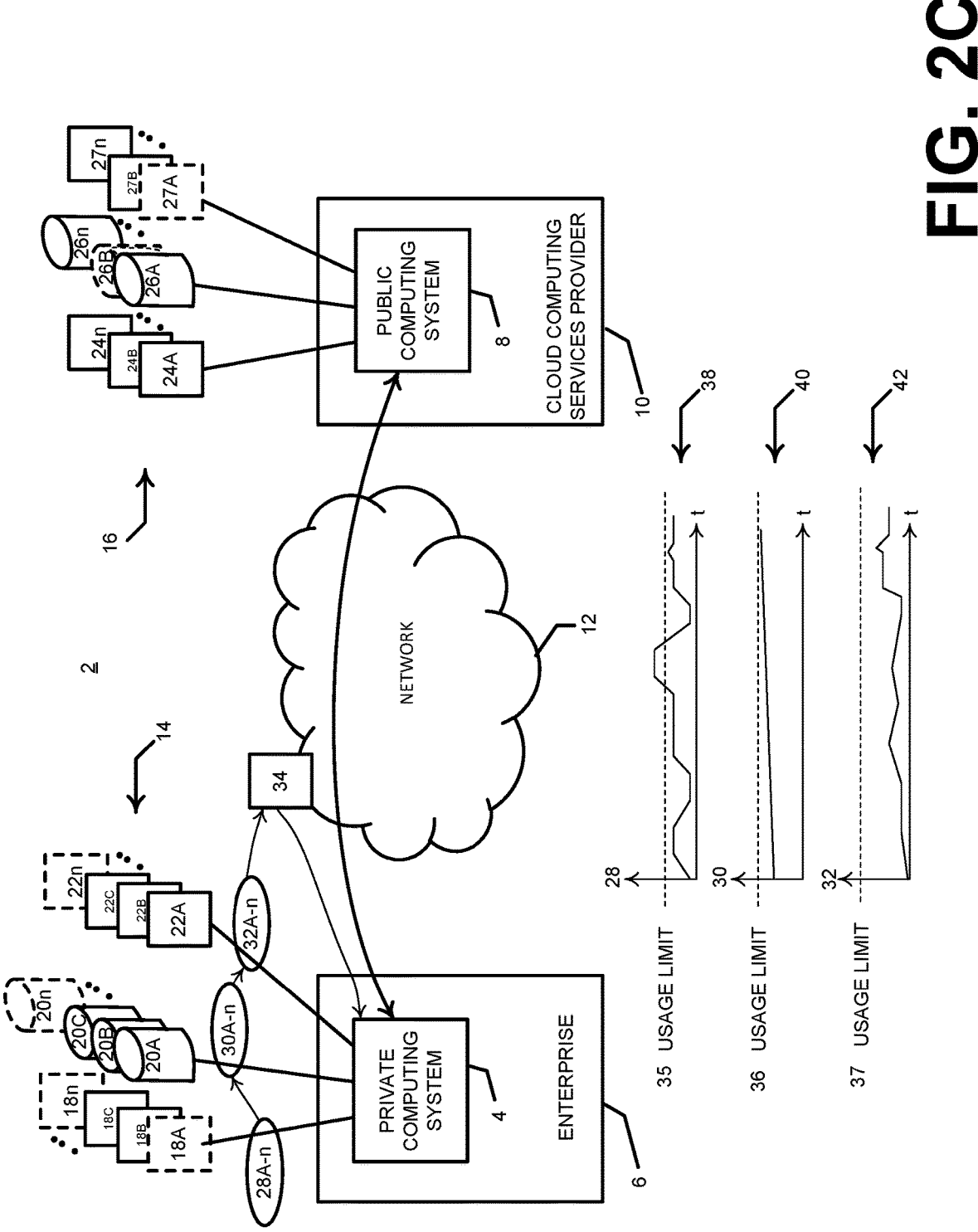
FIG. 2C illustrates an exemplary hybrid computing system showing an aspect with additional active and inactive components of a private computing portion of the hybrid computing system and inactive components of a public computing portion of the hybrid computing system.

Turning now to FIG. 2C, metric 38 is shown still mostly not exceeding usage criteria 35. Based on an analysis of usage history of processing component 18A with respect to usage criteria 35, management service 34 has determined to activate processing resource 18C and to deactivate processing resource 18A. Thus, processing resource 18A, which may have a high usage history (i.e., high-mileage in automotive parlance), has been deactivated based on high usage, which corresponds to high wear, and processing resource 18C has been activated to make up for the loss or processing resources caused by the deactivating of processing resource 18A. Even though the same amount of processing resources may be available to computing system 4, processing components with lower wear are currently active as compared to FIG. 2B. In addition, based on an analysis of usage history of resources 22A and 22B with respect to usage criteria 37, management service 34 has determined to activate additional resource 22C. Metric 42 is shown below usage limit criteria 37 after resource 22C has been activated. FIG. 2C also shows in unbroken lines processing resource 24B at public computing system 8 to indicate that in comparison to the scenario shown in FIG. 2B, private computing system 4 may use processing resource 24B during a resource transition period while processing resource 20C is being activated at private computing system 4. Although private computing system 4 may have adequate processing resources when processing resources 18B and 18C are active, during the resource transition period during when processing resource 18C is being activated, which activation may include testing, the private computing system may need to make use of processing resource 24B until processing resource 18C has been tested and is synchronized with the private computing system. Testing, synchronizing, or other actions related to activating a previously inactive processing resource may be referred to as 'settling' of private computing system 4. It will be appreciated that storage resources, or other resources of public computing system 8 may be used by private computing system 4 while a corresponding storage resource or other resource, respectively, at the private computing system, are being activated during corresponding storage resource, or other resource, transition periods.

Figure 3:
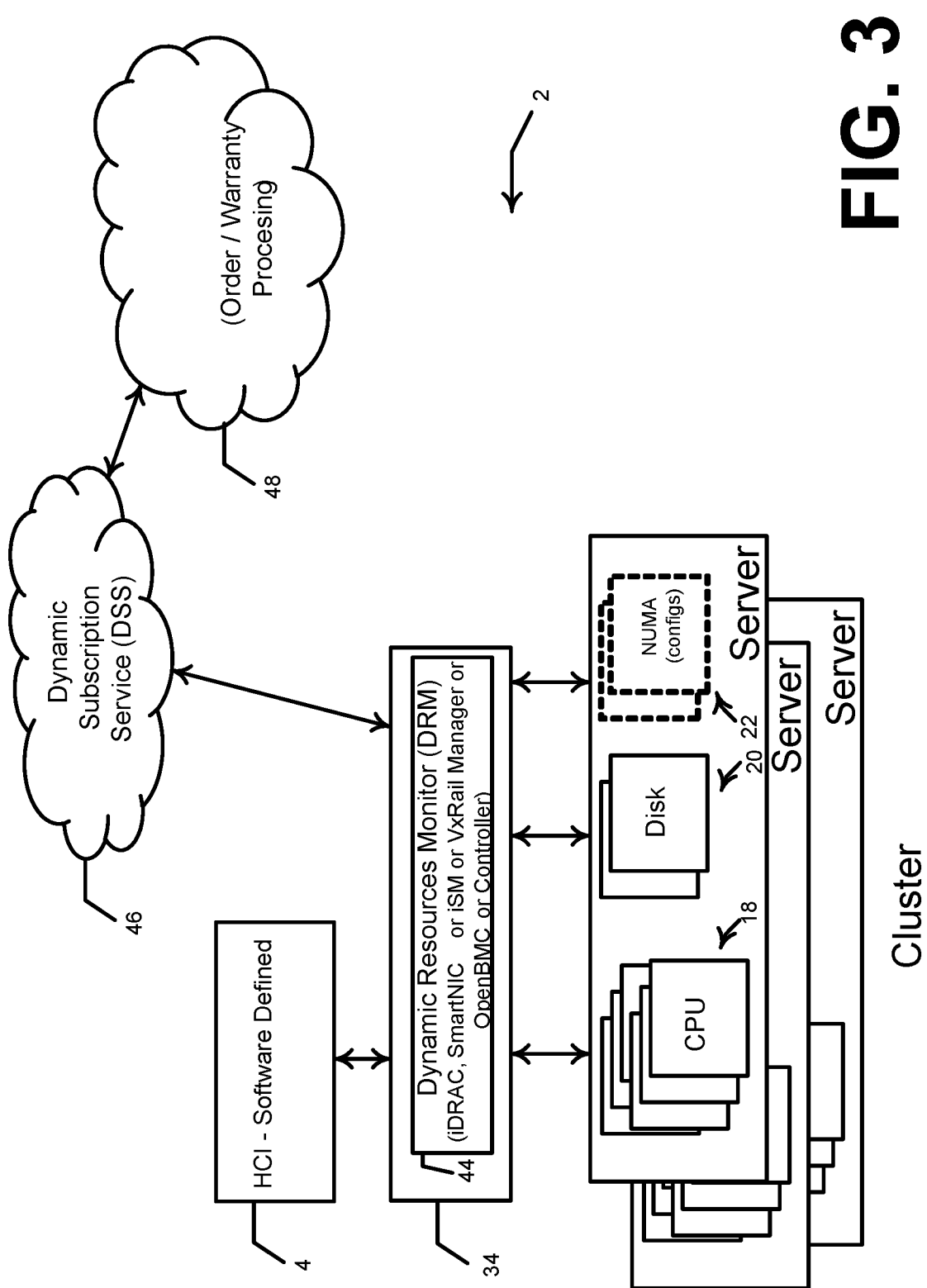
FIG. 3 illustrates an exemplary embodiment system to determine active and subscribed components and resources of a public computing portion of a hybrid computing system.

Turning now to FIG. 3, the figure illustrates an embodiment of system 2 wherein usage of components/resources of private computing system 4 are optimized to minimize warranty costs for active components 18, 20, and 22. Private computing system 4 may comprise a Hyper-Converged Infrastructure ("HCI") that may comprise, or interact with, virtual computing instances implemented by components or resources that are geographically remote from a user of the private computing system (e.g., geographically remote from enterprise 6 shown in FIG. 1). Component/resource manager 34 may comprise a Dynamic Resources Monitor function 44 ("DRM") that receives monitored usage metrics as discussed above and determines a priority of components, or resources, based on a usage factor, such as number of hours a given component or resource has been in use. The usage factor may be referred to as an Inverse Wear Level ("IWL"), indicating a priority that may be determined according to an inverse of the amount of usage, and thus wear and tear, that the component or resource has been subject to, or exposed to. In an embodiment, DRM function 44 may be implemented by, or facilitated by, HCI system software of private computing system 4. Dynamic Subscription Service 46 ("DSS") may be a service provided by a computing service provider that provides computing resources of private computing system 4. DSS 46 may determine a charge, such as, for example, a warranty charge, or subscription charge, based on active components or resources of the private computing network that are active or available for use by an enterprise 6 (shown in FIG. 1), which pay for services, components, or resources at least partially based on usage, or usage metrics corresponding thereto. Usage metrics, which may be, may be related to, may be converted to, or may comprise, wear metrics, such as an amount of wear, and which may be monitored by monitors 28A-28*n*, 30A-30*n*, and 32A-32*n*, as shown in FIG. 1, may be reported to DSS 46 shown in FIG. 3. A charge, such as a warranty charge, may be higher for a component that has been subject to a first amount of wear than a similar component that has been subject to a second amount of wear that is less that the first amount of wear.

Figure 4:
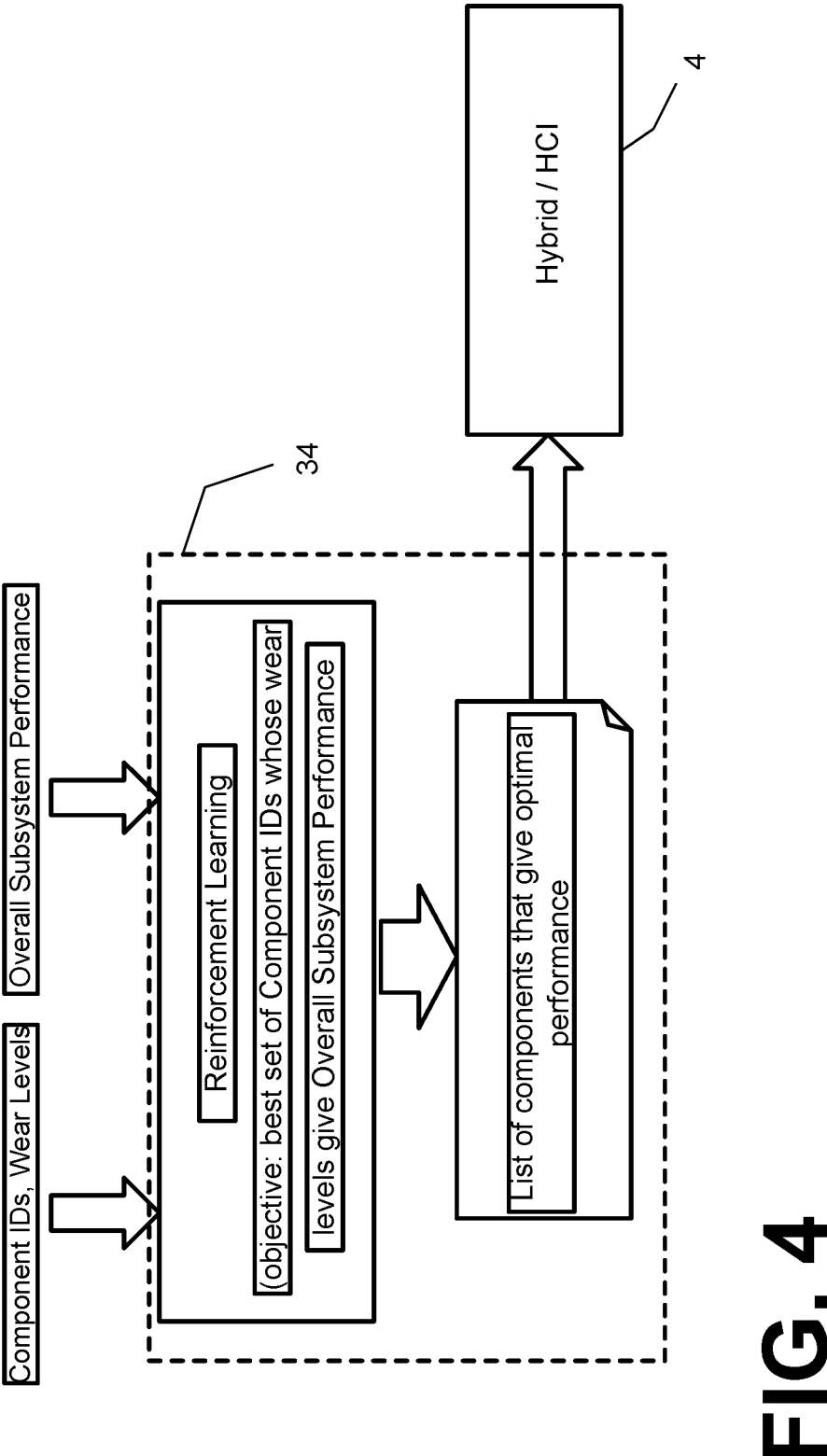
FIG. 4 illustrates a learning model for optimizing and orchestrating a combination of active and inactive components of a hybrid computing system.
Figure 5:
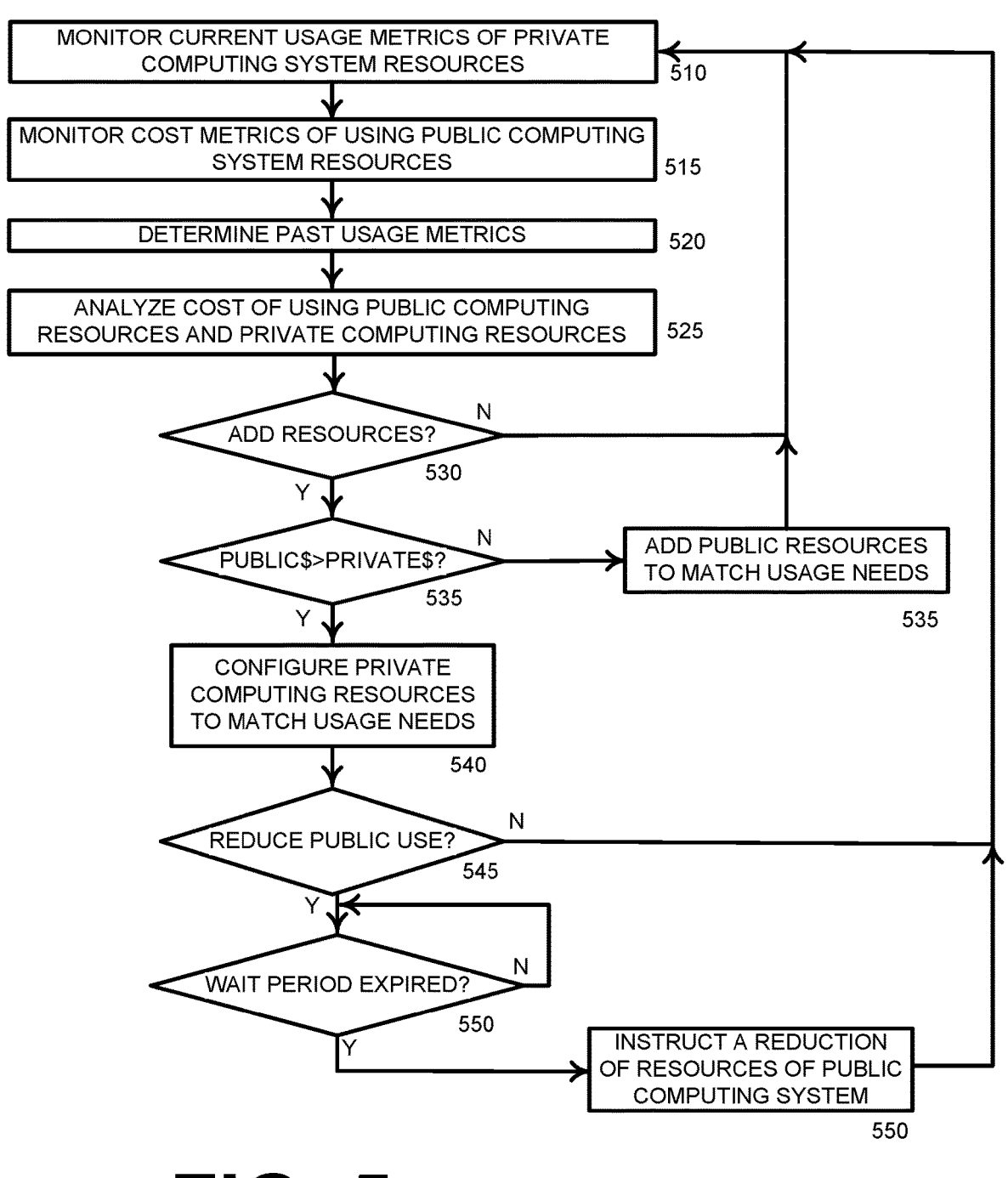
FIG. 5 illustrates a flow diagram of an embodiment method that optimizes a combination of active and inactive components of public computing portion of hybrid computing system to satisfy performance criteria.

Turning now to FIG. 4, the figure illustrates an exemplary embodiment to facilitate optimizing use of computing components and resources of a private computing system of a hybrid computing system. Monitored metrics 38, 40, and 42 from components or resources of a private computing network 4, along with identifiers of the components or the resources, are input into learning model 52. Cost information related to using components or resources of a public computing system of the hybrid computing system may also be input into learning model 52. Learning model 52 may comprise an unsupervised model that uses past usage history of types of activated components, such as processing resources, storage resources, or other computing resources, and cost history information from using components and resources of a public computing system instead while similar components or resources of the private computing network are inactive to determine an optimal balance of supporting computing resource needs of an organization, such as enterprise 6 shown FIG. 1, and cost of resources of the private computing system and a public computing system. In an embodiment, the learning model may seek to minimize warranty costs of components or resources of private computing system 4 by favoring use of one or more components or resources of a plurality of components or resources being associated with a low wear value (e.g., a value corresponding a low of amount of use) as compared to wear or use of other components of the plurality of component or resources and disfavoring use of one or more components or resources of the plurality of components or resources being associated with a high wear value (e.g., a value corresponding to a high of amount of use) as compared to wear or use of other components of the plurality of component or resources. Using components or resources having a wear value below a threshold and by inactivating similar components that have a wear value above the threshold a warranty cost may be minimized. Thus, a components or resources manager associated with a private computing system may determine to use certain components or resources and deactivate other components or resources to minimize warranty costs while also using an amount of active components or resources at the private network that meet usage needs of the private computing network and minimize usage of a private computing network based on analysis of one or more monitored usage metrics and cost to use components of a public network instead of activating similar components or resources of the private computing system. Turning now to FIG. 5, the figure illustrates a flow diagram of a method 500 to optimize computer component or computer resource usage in a hybrid computer system. At step 510 metrics of a private computing system may be monitored. The metrics may comprise information related to usage of components or resources of the private computer system. At step 515 metrics of using public computing system resources are monitored or acquired. Computing resources of a public computing system may be used instead of similar, corresponding, resources of a private computing network based on cost reasons. For example, if components or resources of the private computing network provide adequate resources for most needs of users of the private computing system, but occasionally additional resources are needed for workloads that exceed normal, or average, workloads of the private computing system, the private computing system may engage resources of a public computing system to handle temporary increases in needs of computing resources. At step 520 past usage metrics of the private computing system may be determined. Such determination may comprise retrieving records of past computing resources usage from a database. At step 525 the current usage metrics retrieved, monitored, or determined at step 510 and the cost metrics of using computing system resources of a public computing system are analyzed. Such analysis may include determining how often additional public computing resources are needed to handle increased workloads placed on the private computing system. The analysis may determine that a current configuration of active and inactive components or resources of the private computing system are adequate based on a criterion and that workload needs that require usage of a public computing system are infrequent enough that activating an additional computing resource or component of the private computing system would not be cost effective. Part of the analysis may be based on the fact that usage of components or resources of the private computing system may have a subscription cost associated with them when they are active but may not have a subscription cost associated with them when they are inactive. Thus, if use of public computing resources is only occasional the additional cost of using public computing resources may be determined to not outweigh additional subscription costs of activating components or resources of the private computing system. It will be appreciated that subscription costs associated with components or resources of the private computing system may include warranty costs, which may be based on amount of past usage corresponding to a given component, or resource, of the private computing system. Such prior usage may be based on past usage metrics, factors, or values, determined at step 520.

At step 530 a determination may be made based on the analysis performed at step 525 that additional resources are needed by the private computing system to handle workloads that exceed a determined threshold corresponding to one or more components or resources of the private computing system. If a determination is made at step 530 that more resources than are currently being used are not needed, whether the resources are provided by the private computing system or the public computing system, method 500 returns to step 510. If a determination is made at step 530 that additional resources of the private computing system are needed, method 500 advances to step 535

At step 535 a determination may be made based on the analysis performed at step 525 that a cost benefit would be realized by activating a currently inactive component, or resource, of the private computing system instead of engaging components or resources of the public computing system to handle workload increases if the workload increases occur with a frequency such that the amount of usage of resources of the public computing system during a determined subscription period, such as one month, has a cost associated with it that exceeds a subscription cost with activating a currently inactive component or resource of the private network to handle the additional workload. If a determination is made at step 535 that a benefit would not be realized by activating a currently inactive component or resource of the private computing system method 500 may add public resources to handle an increase in workload demand at step 537 and then return to step 510. If, however, a determination is made at step 535 that a cost benefit would be realized by activating a currently inactive component or resource of the private computing system instead of engaging resources or components of the public computing system, method 500 advances to step 540.

At step 540 computing resources or components of the private computing system may be configured to satisfy, match, or otherwise facilitate handling the workload increase by components of the private computing system. Such configuring of components or resources at step 540 may include adding more processing components, storage components or resources, or other computing resources. At step 545 a determination may be made whether the addition, or activation, of previously inactive components or resources of the private computing system will reduce the need for currently used components or resources of the public computing system. If a determination made at step 545 is that computing resources of the public computing system are not to be reduced method 500 returns to step 510. If, however, a determination made at step 545 is that the addition of computing resources or components of the private computing system can handle not only the additional workload for which the components of the private computing system were activated at step 540 but also the previous workload then a determination may be made that components or resources of the public computing system may be reduced and method 500 advances to step 550. At step 550 a determination may be made whether a wait period, or integration period, has expired. If the wait period, or integration period, has not expired method 500 returns to step 550. If a determination is made that the wait period, or integration period, has expired method 500 advances from step 550 to step 555. At step 555 resources at the public computing system may be instructed to be reduced and method 500 returns to step 510. It will be appreciated that the configuring that occurs at step 540 may also include a wait period, or integration period, such as described in reference to step 550. The wait period, or integration period, described in reference to step 550, or a similar wait period, or integration period, which may occur at step 540, may be implemented to allow newly activated components, or resources, of the private computing system 2 to boot up, to be populated with data, to be tested, or to otherwise be integrated for normal operation with the private computing system. Thus, the wait period, or integration period, may be a period determined to be at least as long as a determined amount of time to integrate newly activated components, or resources, into the private computing system. Thus, during the wait periods, or integration periods, even if a computing resource or component of the public computing system is to be reduced or no longer used, that resource of the public computing system may nevertheless be used, and paid for by an organization corresponding to the private computing system, until the newly activated component(s) or resource(s) of the private computing system is/are up and running (e.g., after the wait period, or integration period. Method 500 may be implemented by a module running on the private computing system.

Figure 6:
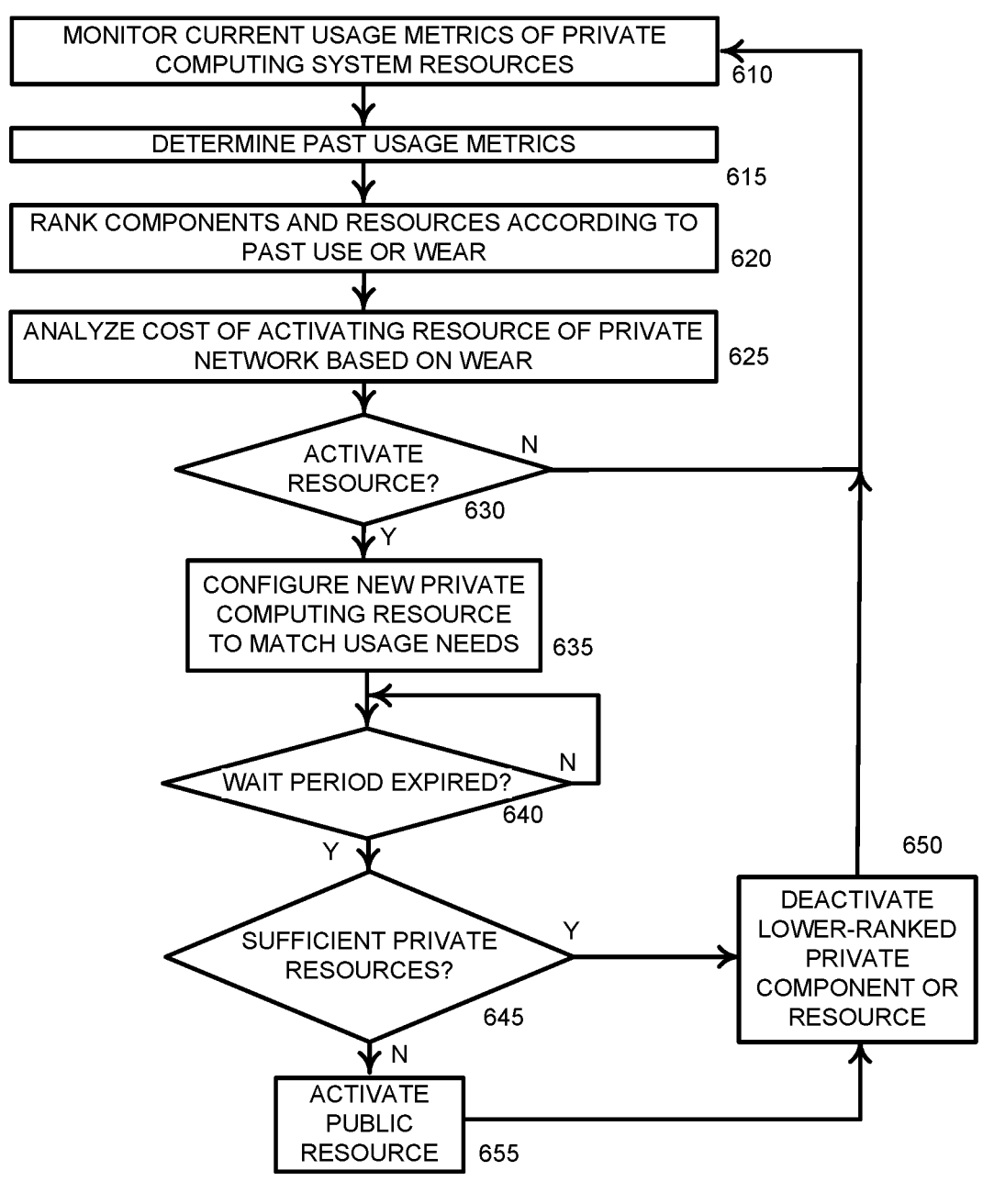
FIG. 6 illustrates a flow diagram of an embodiment method that optimizes a combination of active and inactive components of public computing portion of hybrid computing system to satisfy performance criteria and that optimizes subscription costs based on component wear.

Turning now to FIG. 6, the figure illustrates a flow diagram of a method 600. At step 610 current usage metrics of a private computing system are monitored. System metrics monitored at step 610 may comprise processing resource usage, storage capacity, for example a percentage of a maximum storage capacity, or outright storage capacity, or other metrics related to other computing resources. At step 615 past usage metrics may be determined corresponding to past processing usage of processing components, past storage metrics of storage components, or other metrics of other components or resources of a private computing system. Past storage metrics may comprise time in service, or time active, of a given component or resource. At step 620 components or resources may be ranked according to past usage. For example, between two different storage components, one having been in service longer than the other may be assigned a lower rank. In an alternative ranking, a resource, such as a storage, may be assigned a higher rank than another if it has been in service longer than the other storage. The ranking, and the assignment of ranks, may be based on an algorithm used to analyze and determine a cost benefit of keeping a currently active component or resource in service, or a cost benefit of deactivating a component, or resource, and activating a different component or resource of similar type to perform functions the deactivated, or soon-to-be-deactivated, component or resource had been performing.

At step 625 an analysis may be performed of currently active, as well as currently inactive, components of the private computing system relative to component wear. Wear, or a wear factor corresponding to wear, may be based on amount of time a particular component, or resource, has been in service. The analysis performed at step 625 may be used to determine a cost of continuing to keep a currently active component or resource in service or deactivating it and activating another component or resource to take its place. Such costs may be based on a warranty cost, which may be based on wear. For example, if the private computing system is provided by a computing resources provider, the computing resources provider may charge a warranty cost that may be included in a monthly subscription, for example, and the warranty cost for a given component may be higher for a given component than a warranty cost for a similar component or resource that has not been in service for as long a period. For example, between two storage components, for example hard disk drives, if one of the storage components has been in service for one year while the other has been inactive and not used for that same year, even if both storage components are similar, a warranty cost for the storage that has been in service for a year may be higher per month, or per other subscription period, than a warranty cost for the component that has not been in service. Thus, a warranty cost may correspond to a ranking as described in reference to step 620 much like an individual's life insurance policy maybe actuarially based on age (i.e., time in service) of the individual.

At step 630 a determination is made based on the analysis performed at step 625 whether to activate a resource and whether to inactivate another resource. The analysis may be based upon ranking performed at step 620. If the determination made at step 630 is that a resource is not to be activated based on ranking or other wear factor, method 600 returns to step 610. If the determination made at step 630 is that a resource or component of the private computing system should be activated based on the analysis performed at 625, which may indicate that activating a currently inactive component or resource may have a lower warranty cost associated with it during a subscription period, method 600 advances to step 635. At step 635 a private computing system may be configured to match system usage needs and to minimize warranty costs based on the analysis performed at step 625. Such configuration, or configuring, at step 635 may include activating a currently inactive component or resource, such as a hard disk drive, or a processing component or resource. When a determination is made to activate a component or resource based on usage, or wear, to minimize warranty costs, for example, a decision may also be made to deactivate a currently active component. After activating a component or resource at step 635 a wait period, or integration period, may elapse at step 640. If the wait period, or integration period, has not expired method 600 returns to step 640. If the wait period, or integration period, has expired at step 640 a determination may be made at step 645 whether there are currently sufficient components or resources active in the private computing system such that deactivating a component, such as a storage or a processing resource, for example, will not negatively impact performance or operation of the private computing system. If deactivating a component or resource having a higher wear factor, or usage, based on the analysis and rankings performed at steps 620 in step 625 will not cause a decrease is system performance, method 600 advances to step 650 and a component having a lower rank than a similar component activated at step 635 may be deactivated at step 650 and method 600 returns to step 610. If a determination is made that not only does a new component or resource need to be activated to minimize warranty costs but deactivating a currently active component would impose a performance or operational burden that would cause the private computing system to not meet a performance target or threshold for a given type of resource or component, a determination may be made to activate a public resource at step 655. Such need for activating a public resource may be that performance of steps 630 through step 645 are occurring during a high usage period of computing resources of the private computing system and additional resources of the public computing system are needed to handle and increase workload which may be a temporary workload increase. After activating public resources to handle additional temporary workload at step 655 method 600 advances to step 650 and deactivates the lower ranked component or resource of the private computing system and step 600 returns to step 610.

Figure 7:
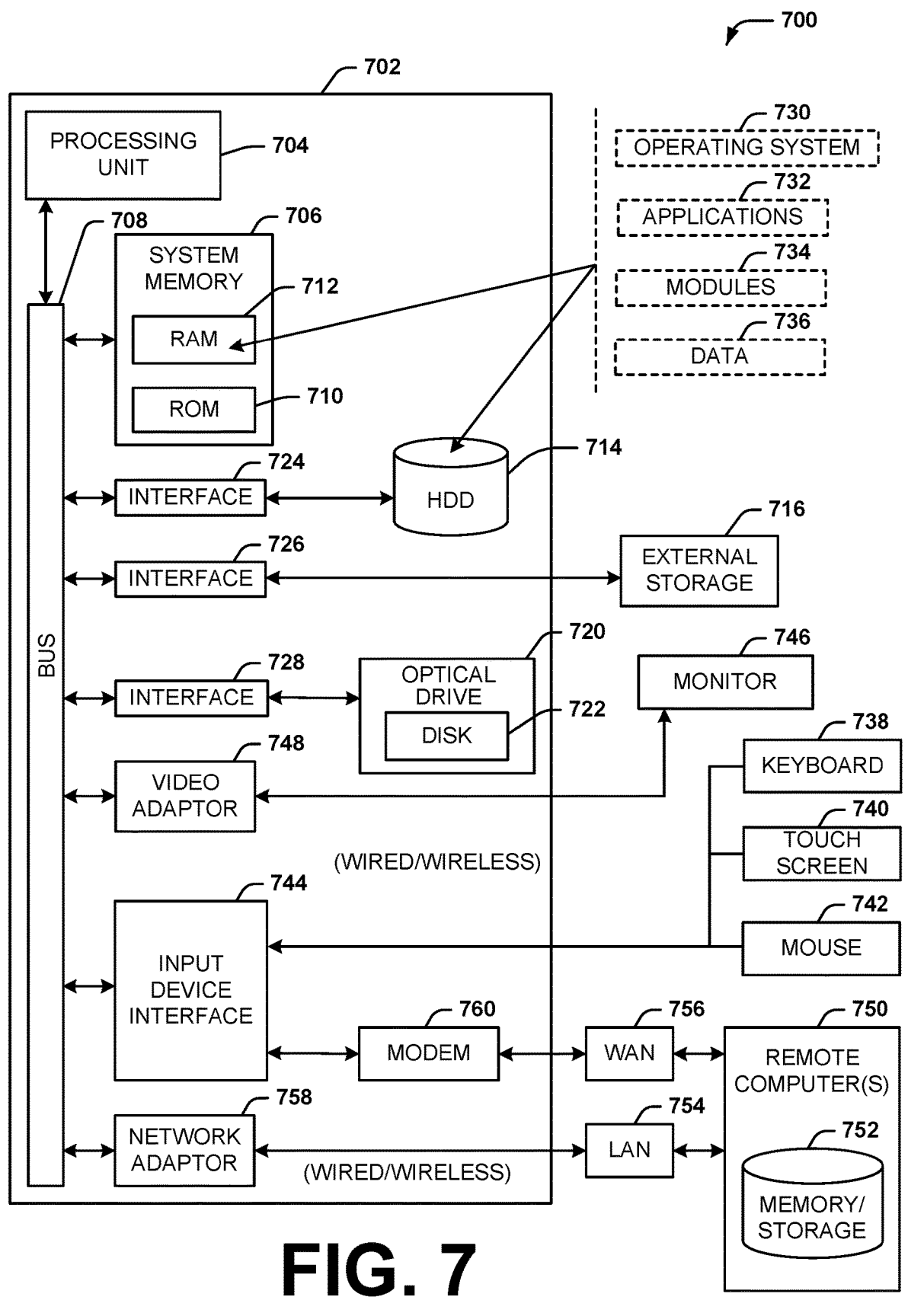
FIG. 7 illustrates a computer environment.

In order to provide additional context for various embodiments described herein, FIG. 7 and the following discussion are intended to provide a brief, general description of a suitable computing environment 700 in which various embodiments of the embodiment described herein can be implemented. While embodiments have been described above in the general context of computer-executable instructions that can run on one or more computers, those skilled in the art will recognize that the embodiments can be also implemented in combination with other program modules and/or as a combination of hardware and software.

Generally, program modules include routines, programs, components, data structures, etc., that perform particular tasks or implement particular abstract data types. Moreover, those skilled in the art will appreciate that the methods can be practiced with other computer system configurations, including single-processor or multiprocessor computer systems, minicomputers, mainframe computers, IoT devices, distributed computing systems, as well as personal computers, hand-held computing devices, microprocessor-based or programmable consumer electronics, and the like, each of which can be operatively coupled to one or more associated devices.

The embodiments illustrated herein can be also practiced in distributed computing environments where certain tasks are performed by remote processing devices that are linked through a communications network. In a distributed computing environment, program modules can be located in both local and remote memory storage devices.

Computing devices typically include a variety of media, which can include computer-readable storage media, machine-readable storage media, and/or communications media, which two terms are used herein differently from one another as follows. Computer-readable storage media or machine-readable storage media can be any available storage media that can be accessed by the computer and includes both volatile and nonvolatile media, removable and non-removable media. By way of example, and not limitation, computer-readable storage media or machine-readable storage media can be implemented in connection with any method or technology for storage of information such as computer-readable or machine-readable instructions, program modules, structured data or unstructured data.

Computer-readable storage media can include, but are not limited to, random access memory (RAM), read only memory (ROM), electrically erasable programmable read only memory (EEPROM), flash memory or other memory technology, compact disk read only memory (CD-ROM), digital versatile disk (DVD), Blu-ray disc (BD) or other optical disk storage, magnetic cassettes, magnetic tape, magnetic disk storage or other magnetic storage devices, solid state drives or other solid state storage devices, or other tangible and/or non-transitory media which can be used to store desired information. In this regard, the terms "tangible" or "non-transitory" herein as applied to storage, memory or computer-readable media, are to be understood to exclude only propagating transitory signals per se as modifiers and do not relinquish rights to all standard storage, memory or computer-readable media that are not only propagating transitory signals per se.

Computer-readable storage media can be accessed by one or more local or remote computing devices, e.g., via access requests, queries or other data retrieval protocols, for a variety of operations with respect to the information stored by the medium.

Communications media typically embody computer-readable instructions, data structures, program modules or other structured or unstructured data in a data signal such as a modulated data signal, e.g., a carrier wave or other transport mechanism, and includes any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, RF, infrared and other wireless media.

With reference again to FIG. 7, the example environment 700 for implementing various embodiments of the aspects described herein includes a computer 702, the computer 702 including a processing unit 704, a system memory 706 and a system bus 708. The system bus 708 couples system components including, but not limited to, the system memory 706 to the processing unit 704. The processing unit 704 can be any of various commercially available processors and may include a cache memory. Dual microprocessors and other multi-processor architectures can also be employed as the processing unit 704.

The system bus 708 can be any of several types of bus structure that can further interconnect to a memory bus (with or without a memory controller), a peripheral bus, and a local bus using any of a variety of commercially available bus architectures. The system memory 706 includes ROM 710 and RAM 712. A basic input/output system (BIOS) can be stored in a non-volatile memory such as ROM, erasable programmable read only memory (EPROM), EEPROM, which BIOS contains the basic routines that help to transfer information between elements within the computer 702, such as during startup. The RAM 612 can also include a high-speed RAM such as static RAM for caching data.

Computer 702 further includes an internal hard disk drive (HDD) 714 (e.g., EIDE, SATA), one or more external storage devices 716 (e.g., a magnetic floppy disk drive (FDD) 716, a memory stick or flash drive reader, a memory card reader, etc.) and an optical disk drive 720 (e.g., which can read or write from a CD-ROM disc, a DVD, a BD, etc.). While the internal HDD 714 is illustrated as located within the computer 702, the internal HDD 714 can also be configured for external use in a suitable chassis (not shown). Additionally, while not shown in environment 700, a solid-state drive (SSD) could be used in addition to, or in place of, an HDD 714. The HDD 714, external storage device(s) 716 and optical disk drive 720 can be connected to the system bus 708 by an HDD interface 724, an external storage interface 726 and an optical drive interface 728, respectively. The interface 724 for external drive implementations can include at least one or both of Universal Serial Bus (USB) and Institute of Electrical and Electronics Engineers (IEEE) 1394 interface technologies. Other external drive connection technologies are within contemplation of the embodiments described herein.

The drives and their associated computer-readable storage media provide nonvolatile storage of data, data structures, computer-executable instructions, and so forth. For the computer 702, the drives and storage media accommodate the storage of any data in a suitable digital format. Although the description of computer-readable storage media above refers to respective types of storage devices, it should be appreciated by those skilled in the art that other types of storage media which are readable by a computer, whether presently existing or developed in the future, could also be used in the example operating environment, and further, that any such storage media can contain computer-executable instructions for performing the methods described herein.

A number of program modules can be stored in the drives and RAM 712, including an operating system 730, one or more application programs 732, other program modules 734 and program data 736. All or portions of the operating system, applications, modules, and/or data can also be cached in the RAM 712. The systems and methods described herein can be implemented utilizing various commercially available operating systems or combinations of operating systems.

Computer 702 can optionally comprise emulation technologies. For example, a hypervisor (not shown) or other intermediary can emulate a hardware environment for operating system 730, and the emulated hardware can optionally be different from the hardware illustrated in FIG. 7. In such an embodiment, operating system 730 can comprise one virtual machine (VM) of multiple VMs hosted at computer 702. Furthermore, operating system 730 can provide runtime environments, such as the Java runtime environment or the .NET framework, for applications 732. Runtime environments are consistent execution environments that allow applications 732 to run on any operating system that includes the runtime environment. Similarly, operating system 730 can support containers, and applications 732 can be in the form of containers, which are lightweight, standalone, executable packages of software that include, e.g., code, runtime, system tools, system libraries and settings for an application.

Further, computer 702 can comprise a security module, such as a trusted processing module (TPM). For instance, with a TPM, boot components hash next in time boot components, and wait for a match of results to secured values, before loading a next boot component. This process can take place at any layer in the code execution stack of computer 602, e.g., applied at the application execution level or at the operating system (OS) kernel level, thereby enabling security at any level of code execution.

A user can enter commands and information into the computer 702 through one or more wired/wireless input devices, e.g., a keyboard 738, a touch screen 740, and a pointing device, such as a mouse 742. Other input devices (not shown) can include a microphone, an infrared (IR) remote control, a radio frequency (RF) remote control, or other remote control, a joystick, a virtual reality controller and/or virtual reality headset, a game pad, a stylus pen, an image input device, e.g., camera(s), a gesture sensor input device, a vision movement sensor input device, an emotion or facial detection device, a biometric input device, e.g., fingerprint or iris scanner, or the like. These and other input devices are often connected to the processing unit 704 through an input device interface 744 that can be coupled to the system bus 708, but can be connected by other interfaces, such as a parallel port, an IEEE 1394 serial port, a game port, a USB port, an IR interface, a BLUETOOTH® interface, etc.

A monitor 746 or other type of display device can be also connected to the system bus 608 via an interface, such as a video adapter 748. In addition to the monitor 746, a computer typically includes other peripheral output devices (not shown), such as speakers, printers, etc.

The computer 702 can operate in a networked environment using logical connections via wired and/or wireless communications to one or more remote computers, such as a remote computer(s) 750. The remote computer(s) 750 can be a workstation, a server computer, a router, a personal computer, portable computer, microprocessor-based entertainment appliance, a peer device or other common network node, and typically includes many or all of the elements described relative to the computer 702, although, for purposes of brevity, only a memory/storage device 752 is illustrated. The logical connections depicted include wired/wireless connectivity to a local area network (LAN) 754 and/or larger networks, e.g., a wide area network (WAN) 756. Such LAN and WAN networking environments are commonplace in offices and companies, and facilitate enterprise-wide computer networks, such as intranets, all of which can connect to a global communications network, e.g., the internet.

When used in a LAN networking environment, the computer 702 can be connected to the local network 754 through a wired and/or wireless communication network interface or adapter 758. The adapter 758 can facilitate wired or wireless communication to the LAN 754, which can also include a wireless access point (AP) disposed thereon for communicating with the adapter 758 in a wireless mode.

When used in a WAN networking environment, the computer 702 can include a modem 760 or can be connected to a communications server on the WAN 756 via other means for establishing communications over the WAN 756, such as by way of the internet. The modem 760, which can be internal or external and a wired or wireless device, can be connected to the system bus 708 via the input device interface 744. In a networked environment, program modules depicted relative to the computer 702 or portions thereof, can be stored in the remote memory/storage device 752. It will be appreciated that the network connections shown are example and other means of establishing a communications link between the computers can be used.

When used in either a LAN or WAN networking environment, the computer 702 can access cloud storage systems or other network-based storage systems in addition to, or in place of, external storage devices 716 as described above. Generally, a connection between the computer 702 and a cloud storage system can be established over a LAN 754 or WAN 756 e.g., by the adapter 758 or modem 760, respectively. Upon connecting the computer 702 to an associated cloud storage system, the external storage interface 726 can, with the aid of the adapter 758 and/or modem 760, manage storage provided by the cloud storage system as it would other types of external storage. For instance, the external storage interface 726 can be configured to provide access to cloud storage sources as if those sources were physically connected to the computer 702.

The computer 702 can be operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, store shelf, etc.), and telephone. This can include Wireless Fidelity (Wi-Fi) and BLUETOOTH® wireless technologies. Thus, the communication can be a predefined structure as with a conventional network or simply an ad hoc communication between at least two devices.

Turning now to FIG. 8, the figure illustrates an exemplary embodiment method 800 comprising at block 805 a method, comprising: monitoring, by a computing system comprising a processor, a usage metric relating to at least one active component of a private network that comprises the at least one active component and at least one inactive component and that interoperates with computing equipment of a public computing network in a hybrid computing environment; at block 810 analyzing the usage metric with respect to a usage criterion that corresponds to the usage metric; at block 815 in response to the usage metric being determined to satisfy the usage criterion based on a result of the analyzing, determining to activate a first inactive component of the at least one inactive component; and at block 820 causing the first inactive component to be activated. Method 800 may further comprise at block 825 determining, using a trained learning model, a usage profile for an active component of the at least one active component; at block 830 activating a second inactive component of the at least one inactive component; at block 835 deactivating the active component of the at least one active components to which the usage profile corresponds, and at block 840 wherein the activating of the second inactive component and the deactivating of the active component is based on the determined usage profile.

Turning now to FIG. 9, the figure illustrates a system 900, comprising at block 905 a computing system comprising a processor configured to: monitor a usage metric relating to at least one active component of a private computing system that comprises the at least one active component and at least one inactive component and that interoperates with a public computing system in a hybrid computing environment; at block 910 perform an analysis of the usage metric based on a usage criterion that corresponds to the usage metric; and at block 915 in response to the usage metric being determined to satisfy the usage criterion based on a result of the analysis, determine to activate a first inactive component of the at least one inactive component. The processor of system 900 may be further configured to at block 920 determine, using a trained learning model, a usage profile for an active component of the at least one active components, resulting in a determined usage profile; and at block 925 based on the determined usage profile, activate a second inactive component of the at least one inactive component, and at block 930 deactivate the active component of the at least one active component to which the usage profile corresponds.

Turning now to FIG. 10, the figure illustrates a method 1000 comprising at block 1005 a non-transitory machine-readable medium, comprising executable instructions that, when executed by a processor of a computing device, facilitate performance of operations, comprising at block 1005 monitor a usage metric relating to at least one active component of a private computing system that comprises the at least one active component and at least one inactive component and that interoperates with a public computing system in a hybrid computing environment; at block 1010 determine whether the usage metric satisfies a usage criterion that corresponds to the usage metric; at block 1015 in response to the usage metric being determined to satisfy the usage criterion, determine to activate a first inactive component of the at least one inactive component; at block 1020 determine, using a trained learning model, a usage profile for an active component of the at least one active components, resulting in a determined usage profile; and at block 1025 based on the determined usage profile, activate a second inactive component of the at least one inactive component, and at block 1030 deactivate the active component of the at least one active component to which the usage profile corresponds. The non-transitory machine-readable medium 1000 may further, comprise executable instructions that, when executed by a processor of a computing device, facilitate performance of operations, comprising at step 1035 determine a cost factor based on the usage metric, resulting in a determined cost factor; and at step 1040 determine a warranty charge based on the determined cost factor, wherein at step 1045 the usage criterion is based on usage by the private computing system of a component in the public computing system, and wherein the usage criterion is satisfied in response to a determination that a usage cost of using the component is higher than a warranty cost based on the warranty charge.

The above description includes non-limiting examples of the various embodiments. It is, of course, not possible to describe every conceivable combination of components or methodologies for purposes of describing the disclosed subject matter, and one skilled in the art may recognize that further combinations and permutations of the various embodiments are possible. The disclosed subject matter is intended to embrace all such alterations, modifications, and variations that fall within the spirit and scope of the appended claims.

With regard to the various functions performed by the above-described components, devices, circuits, systems, etc., the terms (including a reference to a "means") used to describe such components are intended to also include, unless otherwise indicated, any structure(s) which performs the specified function of the described component (e.g., a functional equivalent), even if not structurally equivalent to the disclosed structure. In addition, while a particular feature of the disclosed subject matter may have been disclosed with respect to only one of several implementations, such feature may be combined with one or more other features of the other implementations as may be desired and advantageous for any given or particular application.

The terms "exemplary" and/or "demonstrative" or variations thereof as may be used herein are intended to mean serving as an example, instance, or illustration. For the avoidance of doubt, the subject matter disclosed herein is not limited by such examples. In addition, any aspect or design described herein as "exemplary" and/or "demonstrative" is not necessarily to be construed as preferred or advantageous over other aspects or designs, nor is it meant to preclude equivalent structures and techniques known to one skilled in the art. Furthermore, to the extent that the terms "includes," "has," "contains," and other similar words are used in either the detailed description or the claims, such terms are intended to be inclusive—in a manner similar to the term "comprising" as an open transition word—without precluding any additional or other elements.

The term "or" as used herein is intended to mean an inclusive "or" rather than an exclusive "or." For example, the phrase "A or B" is intended to include instances of A, B, and both A and B. Additionally, the articles "a" and "an" as used in this application and the appended claims should generally be construed to mean "one or more" unless either otherwise specified or clear from the context to be directed to a singular form.

The term "set" as employed herein excludes the empty set, i.e., the set with no elements therein. Thus, a "set" in the subject disclosure includes one or more elements or entities. Likewise, the term "group" as utilized herein refers to a collection of one or more entities.

The terms "first," "second," "third," and so forth, as used in the claims, unless otherwise clear by context, is for clarity only and doesn't otherwise indicate or imply any order in time. For instance, "a first determination," "a second determination," and "a third determination," does not indicate or imply that the first determination is to be made before the second determination, or vice versa, etc.

The description of illustrated embodiments of the subject disclosure as provided herein, including what is described in the Abstract, is not intended to be exhaustive or to limit the disclosed embodiments to the precise forms disclosed. While specific embodiments and examples are described herein for illustrative purposes, various modifications are possible that are considered within the scope of such embodiments and examples, as one skilled in the art can recognize. In this regard, while the subject matter has been described herein in connection with various embodiments and corresponding drawings, where applicable, it is to be understood that other similar embodiments can be used or modifications and additions can be made to the described embodiments for performing the same, similar, alternative, or substitute function of the disclosed subject matter without deviating therefrom. Therefore, the disclosed subject matter should not be limited to any single embodiment described herein, but rather should be construed in breadth and scope in accordance with the appended claims below.

What is claimed is:

1. A method, comprising:

monitoring, by at least one controller that is coupled with at least one active component of a private computing system network comprising at least one processor, at least one current usage metric relating to the at least one active component of the private computing system network that comprises the at least one active component and at least one inactive component and that interoperates with computing equipment of a public computing network in a hybrid computing environment;

determining, by the at least one processor, that at least one additional computing resource is needed to facilitate operation of at least one computing workload to result in at least one determined additional computing resource;

analyzing, by the at least one processor, the at least one current usage metric with respect to at least one usage criterion that corresponds to the at least one current usage metric;

determining, by the at least one processor, that the at least one current usage metric satisfies the at least one usage criterion;

responsive to the at least one current usage metric being determined to satisfy the at least one usage criterion based on a result of the analyzing and responsive to the determining of the at least one determined additional computing resource, determining, by the at least one processor, to activate a first inactive component of the at least one inactive component;

causing, by the at least one processor, the first inactive component to be activated;

determining, by the at least one processor using a trained learning model, a usage profile for an active component of the at least one active component;

activating, by the at least one processor, a second inactive component of the at least one inactive component; and responsive to the determining of the usage profile, deactivating, by the at least one processor, the active component of the at least one active components to which the usage profile corresponds;

wherein the activating of the second inactive component and the deactivating of the active component is based on the determined usage profile.

2. The method of claim 1, wherein the at least one current usage metric is representative of a storage utilization value.

3. The method of claim 1, wherein the at least one current usage metric is representative of a computations per second value.

4. The method of claim 1, wherein the at least one current usage metric is representative of a network throughput value.

5. The method of claim 1, wherein the at least one current usage metric is representative of an input/output operations per second value.

6. The method of claim 1, further comprising:

waiting an integration period that corresponds to integrating the activated first inactive component into the private computing network; and wherein the deactivating of the active component of the at least one active component to which the usage profile corresponds occurs after the integration period.

7. The method of claim 1, further comprising determining a cost factor based on the usage metric, resulting in a determined cost factor.

8. The method of claim 7, wherein a warranty charge is based on the determined cost factor.

9. The method of claim 8, wherein the usage criterion is based on usage, via the private network, of a component of the computing equipment of the public computing network, and wherein a threshold associated with the usage criterion is exceeded when a usage cost, corresponding to the usage of the component of the computing equipment of the public network via the private network is higher than a warranty cost determined based on the warranty charge.

10. A system, comprising:

a private computing system comprising a processor configured to:

monitor, via at least one controller that is coupled with at least one active component corresponding to the private computing system, at least one usage metric relating to the at least one active component of the private computing system that comprises the at least one active component and at least one inactive component and that interoperates with a public computing system in a hybrid computing environment;

determine that at least one additional computing resource has been requested to facilitate operation of at least one computing workload to result in at least one determined additional computing resource;

perform an analysis of the at least one usage metric based on a usage criterion that corresponds to the usage metric;

in response to the at least one usage metric being determined to satisfy the usage criterion based on a result of the analysis and in response to the at least one determined additional computing resource being determined, activate a first inactive component of the at least one inactive component to result in the first inactive component becoming a first active component of the at least one active component;

determine, using a trained learning model, a usage profile for an active component of the at least one active component, to result in a determined usage profile;

responsive to the determining of the determined usage profile, activate a second inactive component of the at least one inactive component to result in the second inactive component becoming a second active component; and deactivate the active component of the at least one active component to which the usage profile corresponds, wherein the activating of the first inactive component to become the first active component, the activating of the second inactive component to become the second active component, and the deactivating of the active component of the at least one active component to which the usage profile corresponds are based on at least one usage rank corresponding to the at least one usage metric, corresponding at least to the first inactive component, corresponding to the second inactive component, or corresponding to the active component to which the usage profile corresponds and facilitate balancing wear with respect to the at least one inactive component and the at least one active component, and wherein the at least one usage rank is indicative of wear corresponding to the at least one inactive component to which the usage profile corresponds, the first inactive component, or the second inactive component, and wherein the wear corresponds to an amount of time the at least one active component to which the usage profile corresponds, the first inactive component, or the second inactive component has been in service.

11. The system of claim 10, wherein the processor is further configured to:

determine a cost factor based on the at least one usage metric, resulting in a determined cost factor; and determine a warranty charge based on the determined cost factor, wherein the usage criterion is based on usage by the private computing system of a component in the public computing system, and wherein the usage criterion is satisfied when a usage cost, corresponding to the usage by the private computing system is higher than a warranty cost based on the warranty charge.

12. The system of claim 10, wherein the processor is further configured to determine a cost factor based on the at least one usage metric, wherein the usage criterion is based on usage by the private computing system of a component in the public computing system, wherein the usage criterion is based on a time of week of usage by the private computing system of the component, and wherein the usage criterion is satisfied when a usage cost of using the component of the public computing system is higher than a cost of using the second inactive component of the at least one inactive component.

13. The system of claim 10, wherein the processor is further configured to determine a cost factor based on the at least one usage metric, wherein the usage criterion is based on usage by the private computing system of a component in the public computing system, wherein the usage criterion is based on a frequency of usage by the private computing system of the component, and wherein the usage criterion is satisfied when a usage cost of using the component by the private computing system is higher than a cost of using the component via the public computing system.

14. A non-transitory machine-readable medium, comprising executable instructions that, when executed by a processor of a computing device, facilitate performance of operations, comprising:

monitoring, using a controller corresponding to the computing device, at least one usage metric relating to at least one active component of a private computing system that comprises the at least one active component and at least one inactive component and that interoperates with a public computing system in a hybrid computing environment;

determining that at least one additional computing resource is implicated to facilitate operation of at least one computing workload to result in at least one determined additional computing resource;

determining whether the at least one usage metric satisfies a usage criterion that corresponds to the usage metric;

in response to the at least one usage metric being determined to satisfy the usage criterion, determining to activate a first inactive component of the at least one inactive component;

determining, using a trained learning model, a usage profile for an active component of the at least one active components, resulting in a determined usage profile; and based on the determined usage profile, activating a second inactive component of the at least one inactive component; and deactivating the active component of the at least one active component to which the usage profile corresponds, wherein the activating of the first inactive component, the activating of the second inactive component, and the deactivating of the active component of the at least one active component to which the usage profile corresponds are based on at least one usage rank corresponding to at least one past usage metric, corresponding at least to the first inactive component, corresponding to the second inactive component, or corresponding to the active component to which the usage profile corresponds and facilitate the computing device distributing wear with respect to the at least one inactive component and the at least one active component, wherein the at least one usage rank is indicative of wear corresponding to the at least one inactive component or the active component to which the usage profile corresponds, and wherein the wear corresponds to an amount of time the at least one inactive component or the active component to which the usage profile corresponds.

15. The non-transitory machine-readable medium of claim 14, wherein the operations further comprise:

determining a cost factor based on the at least one usage metric, resulting in a determined cost factor; and determining a warranty charge based on the determined cost factor;

wherein the usage criterion is based on usage by the private computing system of a component in the public computing system, and wherein the usage criterion is satisfied in response to a determination that a usage cost of using the component is higher than a warranty cost based on the warranty charge.

16. The non-transitory machine-readable medium of claim 14, wherein the operations further comprise:

determining a cost factor based on the at least one usage metric, wherein the usage criterion is based on usage by the private computing system of a component in the public computing system, wherein the usage criterion is based on a time of week of usage by the private computing system of the component, and wherein the usage criterion is satisfied in response to a determination that a usage cost of using the component is higher than a cost of using the second inactive component of the at least one inactive component.

17. The non-transitory machine-readable medium of claim 14, wherein the operations further comprise:

determining a cost factor based on the at least one usage metric, wherein the usage criterion is based on usage by the private computing system of a component in the public computing system, wherein the usage criterion is based on a frequency of usage by the private computing system of the component, and wherein the usage criterion is satisfied in response to a determination that a usage cost of using the component is higher than a cost of using the component of the public computing system.

18. The non-transitory machine-readable medium of claim 14, wherein the operations further comprise:

determining a cost factor based on the at least one usage metric, wherein the usage criterion is based on usage by the private computing system of a component in the public computing system in facilitating computing activity of at least one user device in a defined geographic area, wherein the usage criterion is based on an amount of data flow to the private computing system using the component, and wherein the usage criterion is satisfied in response to a determination that a usage cost of using the component is higher than a cost of using the component of the public computing system.

19. The non-transitory machine-readable medium of claim 14, wherein at least one of the activating of the first inactive component, the activating of the second inactive component, or the deactivating of the active component of the at least one active component to which the usage profile corresponds is based on the at least one usage rank corresponding to at least one of the first inactive component, the second inactive component, or the active component of the at least one active component to which the usage profile corresponds.

20. The method of claim 1, wherein the causing of the first inactive component to be activated is based on at least one usage rank corresponding to at least one past usage metric, corresponding to the at least one inactive component, being indicative of wear corresponding to the at least one inactive component to facilitate reducing wear on the at least one active component, and wherein the wear corresponds to an amount of time the at least one inactive component has been in service.

* * * * *